United States Patent
Wang et al.

(10) Patent No.: US 11,510,233 B2
(45) Date of Patent: Nov. 22, 2022

(54) ROTATING SIDELINK SCHEDULER

(71) Applicant: QUALCOMM Incorporated, San Diego, CA (US)

(72) Inventors: Xiaojie Wang, Hillsborough, NJ (US); Piyush Gupta, Bridgewater, NJ (US); Junyi Li, Franklin Park, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 64 days.

(21) Appl. No.: 17/211,284

(22) Filed: Mar. 24, 2021

(65) Prior Publication Data

US 2022/0312457 A1 Sep. 29, 2022

(51) Int. Cl.
*H04W 72/12* (2009.01)
*H04W 92/18* (2009.01)

(52) U.S. Cl.
CPC ... *H04W 72/1278* (2013.01); *H04W 72/1263* (2013.01); *H04W 92/18* (2013.01)

(58) Field of Classification Search
None
See application file for complete search history.

(56) References Cited

U.S. PATENT DOCUMENTS

| 2021/0282121 A1* | 9/2021 | Selvanesan | H04W 72/042 |
| 2022/0078795 A1* | 3/2022 | Ying | H04W 72/0493 |
| 2022/0217731 A1* | 7/2022 | Wang | H04W 72/1278 |

* cited by examiner

*Primary Examiner* — Robert M Morlan
(74) *Attorney, Agent, or Firm* — Harrity & Harrity LLP/Qualcomm Incorporated

(57) ABSTRACT

Various aspects of the present disclosure generally relate to wireless communication. In some aspects, a user equipment (UE) may transmit, to one or more other UEs in a group of wireless network devices that includes the first UE and the one or more other UEs, an indication that the UE is a current sidelink scheduler for the UEs in the group of wireless network devices. The UE may receive, from at least one other UE in the group of wireless network devices, a scheduling request for a sidelink communication to be transmitted by the at least one other UE. The UE may transmit, to the at least one other UE, a grant of resources for the sidelink communication to be transmitted by the at least one other UE. Numerous other aspects are described.

30 Claims, 13 Drawing Sheets

ROTATING SIDELINK SCHEDULER

FIELD OF THE DISCLOSURE

Aspects of the present disclosure generally relate to wireless communication and to techniques and apparatuses for a rotating sidelink scheduler.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes transmitting, to one or more other UEs in a group of wireless network devices that includes the UE and the one or more other UEs, an indication that the UE is a current sidelink scheduler for the UEs in the group of wireless network devices; receiving, from at least one other UE in the group of wireless network devices, a scheduling request for a sidelink communication to be transmitted by the at least one other UE; and transmitting, to the at least one other UE, a grant of resources for the sidelink communication to be transmitted by the at least one other UE.

In some aspects, a method of wireless communication performed by a first UE includes receiving, from a second UE in a group of wireless network devices that includes the first UE and the second UE, an indication that the second UE is a current sidelink scheduler for the group of wireless network devices; transmitting, to the second UE, a scheduling request for a sidelink communication to be transmitted by the first UE; and receiving, from the second UE, a grant of resources for the sidelink communication to be transmitted by the first UE.

In some aspects, a UE for wireless communication includes a memory and one or more processors operatively coupled to the memory, the memory and the one or more processors configured to: transmit, to one or more other UEs in a group of wireless network devices that includes the first UE and the one or more other UEs, an indication that the UE is a current sidelink scheduler for the UEs in the group of wireless network devices; receive, from at least one other UE in the group of wireless network devices, a scheduling request for a sidelink communication to be transmitted by the at least one other UE; and transmit, to the at least one other UE, a grant of resources for the sidelink communication to be transmitted by the at least one other UE.

In some aspects, a first UE for wireless communication includes a memory; and one or more processors operatively coupled to the memory, the memory and the one or more processors configured to: receive, from a second UE in a group of wireless network devices that includes the first UE and the second UE, an indication that the second UE is a current sidelink scheduler for the group of wireless network devices; transmit, to the second UE, a scheduling request for a sidelink communication to be transmitted by the first UE; and receive, from the second UE, a grant of resources for the sidelink communication to be transmitted by the first UE.

In some aspects, a non-transitory computer-readable medium storing a set of instructions for wireless communication includes one or more instructions that, when executed by one or more processors of a UE, cause the UE to: transmit, to one or more other UEs in a group of wireless network devices that includes the first UE and the one or more other UEs, an indication that the UE is a current sidelink scheduler for the UEs in the group of wireless network devices; receive, from at least one other UE in the group of wireless network devices, a scheduling request for a sidelink communication to be transmitted by the at least one other UE; and transmit, to the at least one other UE, a grant of resources for the sidelink communication to be transmitted by the at least one other UE.

In some aspects, a non-transitory computer-readable medium storing a set of instructions for wireless communication includes one or more instructions that, when executed by one or more processors of a first UE, cause the first UE to: receive, from a second UE in a group of wireless network devices that includes the first UE and the second UE, an indication that the second UE is a current sidelink scheduler for the group of wireless network devices; transmit, to the second UE, a scheduling request for a sidelink communication to be transmitted by the first UE; and receive, from the second UE, a grant of resources for the sidelink communication to be transmitted by the first UE.

In some aspects, an apparatus for wireless communication includes means for transmitting, to one or more UEs in a group of wireless network devices, an indication that the apparatus is a current sidelink scheduler for the UEs in the group of wireless network devices; means for receiving, from at least one UE in the group of wireless network devices, a scheduling request for a sidelink communication to be transmitted by the at least one UE; and means for transmitting, to the at least one UE, a grant of resources for the sidelink communication to be transmitted by the at least one UE.

In some aspects, an apparatus for wireless communication includes means for receiving, from a UE in a group of wireless network devices, an indication that the UE is a current sidelink scheduler for the group of wireless network devices; means for transmitting, to the UE, a scheduling request for a sidelink communication to be transmitted by the apparatus; and means for receiving, from the UE, a grant of resources for the sidelink communication to be transmitted by the apparatus.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antenna, radio frequency (RF) chains, power amplifiers, modulators, buffer, processor(s), interleaver, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
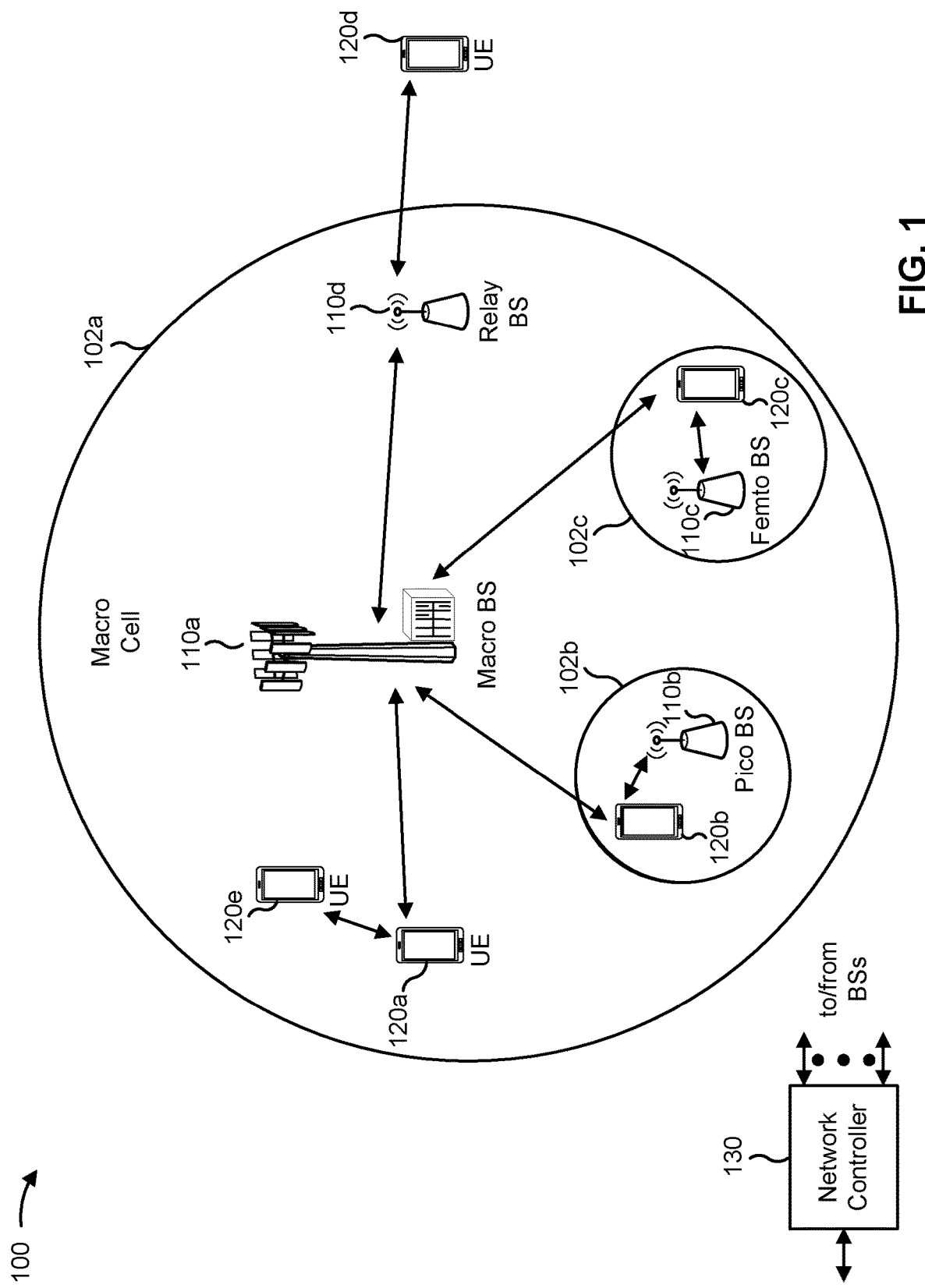
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
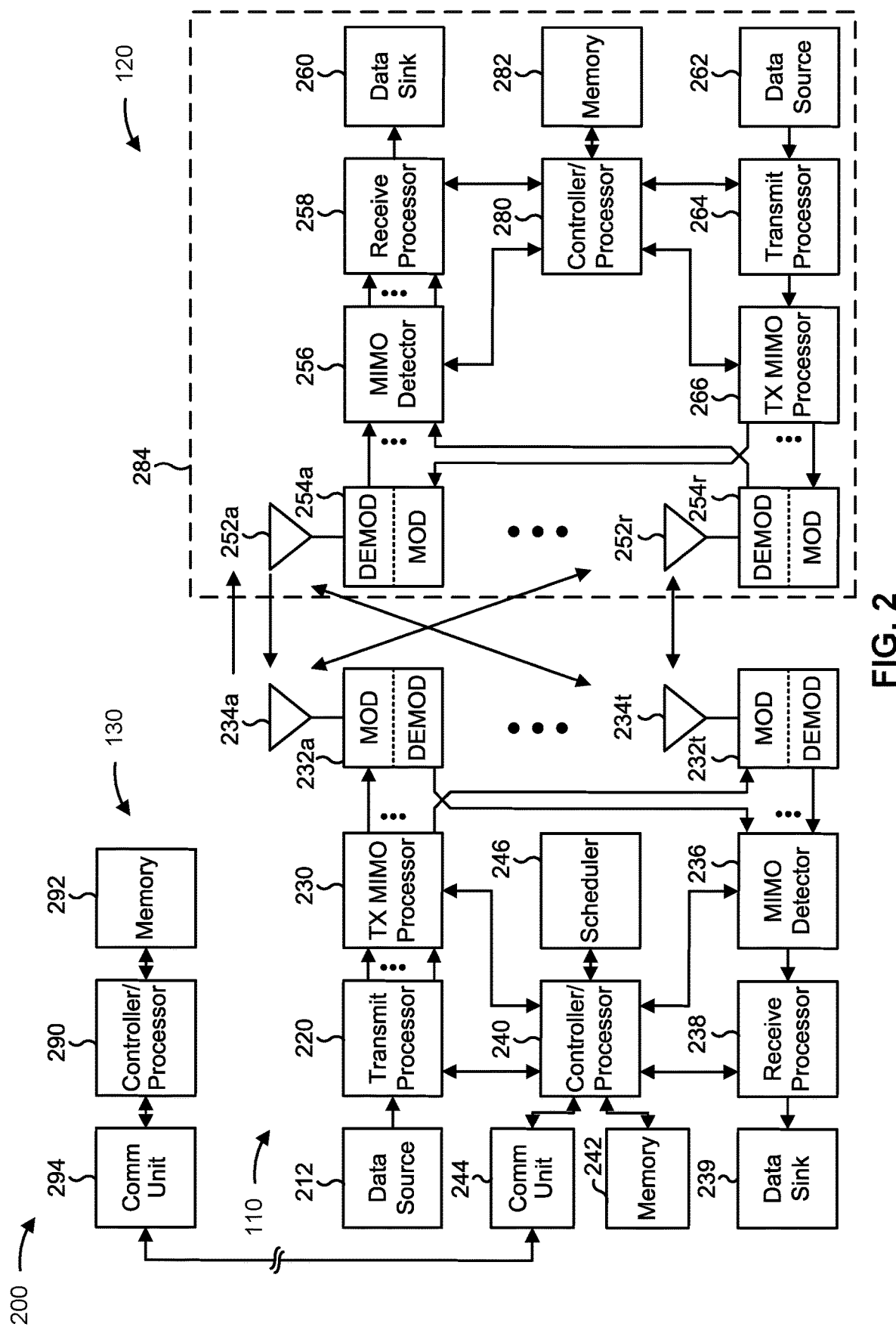
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM) and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 6-12.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 6-12.

Controller/processor 240 of base station 110, controller/processor 280 of UE 120, and/or any other component(s) of FIG. 2 may perform one or more techniques associated with a rotating sidelink scheduler, as described in more detail elsewhere herein. For example, controller/processor 240 of base station 110, controller/processor 280 of UE 120, and/or any other component(s) of FIG. 2 may perform or direct operations of, for example, process 1100 of FIG. 11, process 1200 of FIG. 12, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 1100 of FIG. 11, process 1200 of FIG. 12, and/or other processes as described herein. In some aspects, executing instructions may include running the instructions, converting the instructions, compiling the instructions, and/or interpreting the instructions, among other examples.

In some aspects, the UE 120 includes means for transmitting, to one or more other UEs in a group of wireless network devices that includes the UE and the one or more other UEs, an indication that the UE is a current sidelink scheduler for the UEs in the group of wireless network devices; means for receiving, from at least one other UE in the group of wireless network devices, a scheduling request for a sidelink communication to be transmitted by the at least one other UE; and/or means for transmitting, to the at least one other UE, a grant of resources for the sidelink communication to be transmitted by the at least one other UE. The means for the UE 120 to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the UE 120 includes means for transmitting, to another wireless network device in the group of wireless network devices, an indication that the other wireless network device is a next sidelink scheduler for the UEs in the group of wireless network devices.

In some aspects, the UE 120 includes means for allocating the resources for the sidelink communication to be transmitted by the at least one other UE from a set of resources, granted by a base station, for scheduling sidelink communications by the UEs in the group of wireless network devices.

In some aspects, the UE 120 includes means for transmitting, to the base station, at least one of a request for the set of resources for scheduling the sidelink communications by the UEs in the group of wireless network devices or a request to modify a previously granted set of resources for scheduling the sidelink communications by the UEs in the group of wireless network devices; and/or means for receiving, from the base station, a grant indicating the set of resources for scheduling the sidelink communications by the UEs in the group of wireless network devices.

In some aspects, the UE 120 includes means for allocating the resources for the sidelink communication to be transmitted by the at least one other UE from a set of available resources determined based at least in part on channel sensing performed by the UE or another UE in the group of wireless network devices.

In some aspects, the UE 120 includes means for selecting, from a first resource set granted by a base station and a second resource set determined based at least in part on channel sensing performed by the UE or another UE in the group of wireless network devices, a resource set for scheduling the sidelink communication to be transmitted by the at least one other UE; and/or means for allocating the resources for the sidelink communication to be transmitted by the at least one other UE from the resource set selected for scheduling the sidelink communication to be transmitted by the at least one other UE.

In some aspects, the UE 120 includes means for selecting one of the first resource set or the second resource set based at least in part on a priority associated with the sidelink communication to be transmitted by the at least one other UE.

In some aspects, the UE 120 includes means for transmitting, to the second current sidelink scheduler, a request for resources in the second resource set for scheduling the sidelink communication to be transmitted by the at least one other UE; means for receiving, from the second current sidelink scheduler, an indication of available resources in the second resource set; and/or means for allocating the resources for the sidelink communication to be transmitted by the at least one other UE from the available resources in the second resource set.

In some aspects, the UE 120 includes means for performing a reduced channel sensing procedure based at least in part on a determination that the available resources in the second resource set are sufficient for the UEs in the group of wireless network devices; and/or means for allocating the resources for the sidelink communication to be transmitted by the at least one other UE from the available resources in the second resource set based at least in part on performing the reduced channel sensing procedure.

In some aspects, the UE 120 includes means for receiving, from a second UE in a group of wireless network devices that includes the UE and the second UE, an indication that the second UE is a current sidelink scheduler for the group of wireless network devices; means for transmitting, to the second UE, a scheduling request for a sidelink communication to be transmitted by the UE; and/or means for receiving, from the second UE, a grant of resources for the sidelink communication to be transmitted by the UE. The means for the UE 120 to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the UE 120 includes means for transmitting the sidelink communication using the resources indicated in the grant received from the second UE.

In some aspects, the UE 120 includes means for transmitting the sidelink communication using the resources indicated in the grant received from the second UE, without performing channel sensing.

In some aspects, the UE 120 includes means for selecting, from the multiple current sidelink schedulers, to transmit the scheduling request to the second UE based at least in part on at least one of a distance between the UE and the second UE, a path loss between the UE and the second UE, or a priority associated with the sidelink communication to be transmitted by the UE.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
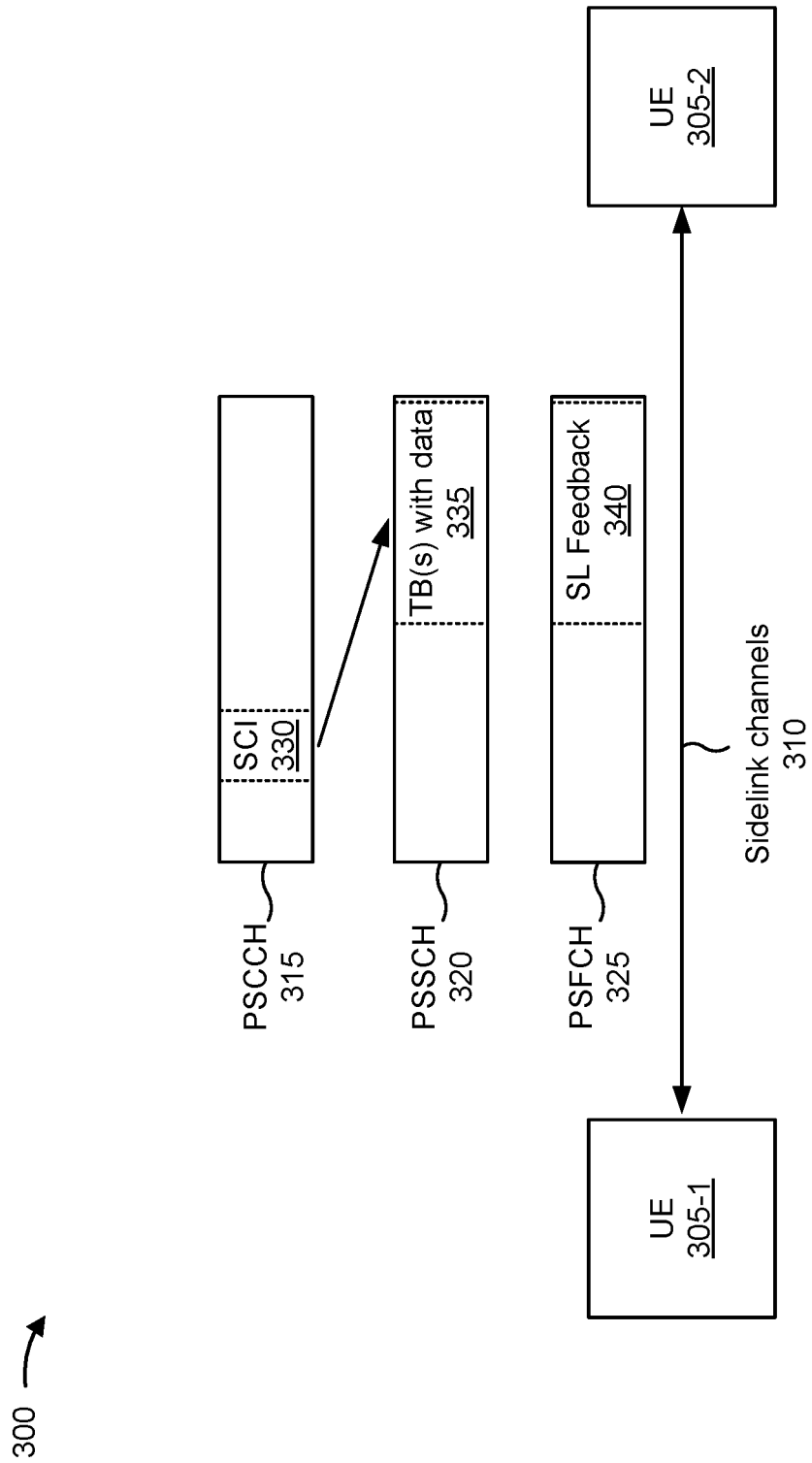
FIG. 3 is a diagram illustrating an example of sidelink communications, in accordance with the present disclosure.

FIG. 3 is a diagram illustrating an example 300 of sidelink communications, in accordance with the present disclosure.

As shown in FIG. 3, a first UE 305-1 may communicate with a second UE 305-2 (and one or more other UEs 305) via one or more sidelink channels 310. The UEs 305-1 and 305-2 may communicate using the one or more sidelink channels 310 for P2P communications, D2D communications, V2X communications (e.g., which may include V2V communications, V2I communications, and/or vehicle to pedestrian (V2P) communications) and/or mesh networking. In some aspects, the UEs 305 (e.g., UE 305-1 and/or UE 305-2) may correspond to one or more other UEs described elsewhere herein, such as UE 120. In some aspects, the one or more sidelink channels 310 may use a PC5 interface and/or may operate in a high frequency band (e.g., the 5.9 GHz band). Additionally, or alternatively, the UEs 305 may synchronize timing of transmission time intervals (TTIs) (e.g., frames, subframes, slots, or symbols) using global navigation satellite system (GNSS) timing.

As further shown in FIG. 3, the one or more sidelink channels 310 may include a physical sidelink control channel (PSCCH) 315, a physical sidelink shared channel (PSSCH) 320, and/or a physical sidelink feedback channel (PSFCH) 325. The PSCCH 315 may be used to communicate control information, similar to a physical downlink control channel (PDCCH) and/or a physical uplink control channel (PUCCH) used for cellular communications with a base station 110 via an access link or an access channel The PSSCH 320 may be used to communicate data, similar to a physical downlink shared channel (PDSCH) and/or a physical uplink shared channel (PUSCH) used for cellular communications with a base station 110 via an access link or an access channel. For example, the PSCCH 315 may carry sidelink control information (SCI) 330, which may indicate various control information used for sidelink communications, such as one or more resources (e.g., time resources, frequency resources, and/or spatial resources) where a transport block (TB) 335 may be carried on the PSSCH 320. The TB 335 may include data. The PSFCH 325 may be used to communicate sidelink feedback 340, such as hybrid automatic repeat request (HARQ) feedback (e.g., acknowledgement or negative acknowledgement (ACK/NACK) information), transmit power control (TPC), and/or a scheduling request (SR).

In some aspects, the one or more sidelink channels 310 may use resource pools. For example, a scheduling assignment (e.g., included in SCI 330) may be transmitted in sub-channels using specific resource blocks (RBs) across time. In some aspects, data transmissions (e.g., on the PSSCH 320) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 305 may operate using a transmission mode where resource selection and/or scheduling is performed by the UE 305 (e.g., rather than a base station 110). In some aspects, the UE 305 may perform resource selection and/or scheduling by sensing channel availability for transmissions. For example, the UE 305 may measure an RSSI parameter (e.g., a sidelink-RSSI (S-RSSI) parameter) associated with various sidelink channels, may measure a RSRP parameter (e.g., a PSSCH-RSRP parameter) associated with various sidelink channels, and/or may measure a RSRQ parameter (e.g., a PSSCH-RSRQ parameter) associated with various sidelink channels, and may select a channel for transmission of a sidelink communication based at least in part on the measurement(s).

Additionally, or alternatively, the UE 305 may perform resource selection and/or scheduling using SCI 330 received in the PSCCH 315, which may indicate occupied resources and/or channel parameters. Additionally, or alternatively, the UE 305 may perform resource selection and/or scheduling by determining a channel busy rate (CBR) associated with various sidelink channels, which may be used for rate control (e.g., by indicating a maximum number of resource blocks that the UE 305 can use for a particular set of subframes).

In the transmission mode where resource selection and/or scheduling is performed by a UE 305, the UE 305 may generate sidelink grants, and may transmit the grants in SCI 330. A sidelink grant may indicate, for example, one or more parameters (e.g., transmission parameters) to be used for an upcoming sidelink transmission, such as one or more resource blocks to be used for the upcoming sidelink transmission on the PSSCH 320 (e.g., for TBs 335), one or more subframes to be used for the upcoming sidelink transmission, and/or an MCS to be used for the upcoming sidelink transmission. In some aspects, a UE 305 may generate a sidelink grant that indicates one or more parameters for semi-persistent scheduling (SPS), such as a periodicity of a sidelink transmission. Additionally, or alternatively, the UE 305 may generate a sidelink grant for event-driven scheduling, such as for an on-demand sidelink message.

As indicated above, FIG. 3 is provided as an example. Other examples may differ from what is described with respect to FIG. 3.

Figure 4:
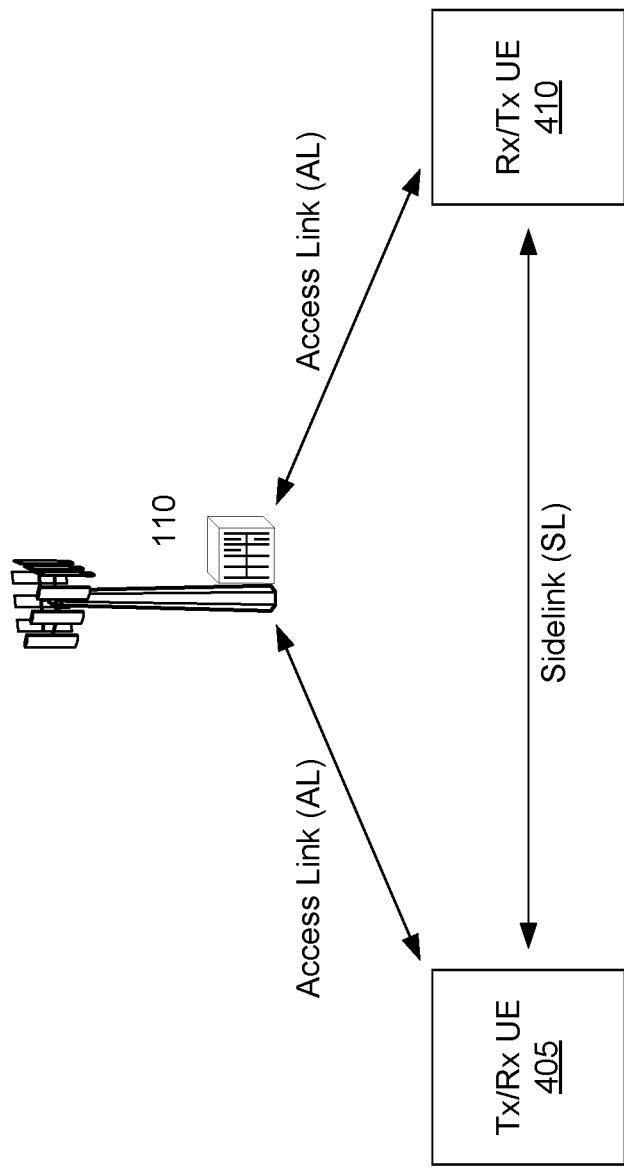
FIG. 4 is a diagram illustrating an example of sidelink communications and access link communications, in accordance with the present disclosure.

FIG. 4 is a diagram illustrating an example 400 of sidelink communications and access link communications, in accordance with the present disclosure.

As shown in FIG. 4, a transmitter (Tx)/receiver (Rx) UE 405 and an Rx/Tx UE 410 may communicate with one another via a sidelink, as described above in connection with FIG. 3. As further shown, in some sidelink modes, a base station 110 may communicate with the Tx/Rx UE 405 via a first access link. Additionally, or alternatively, in some sidelink modes, the base station 110 may communicate with the Rx/Tx UE 410 via a second access link. The Tx/Rx UE 405 and/or the Rx/Tx UE 410 may correspond to one or more UEs described elsewhere herein, such as the UE 120 of FIG. 1. Thus, a direct link between UEs 120 (e.g., via a PC5 interface) may be referred to as a sidelink, and a direct link between a base station 110 and a UE 120 (e.g., via a Uu interface) may be referred to as an access link. Sidelink communications may be transmitted via the sidelink, and access link communications may be transmitted via the access link. An access link communication may be either a downlink communication (from a base station 110 to a UE 120) or an uplink communication (from a UE 120 to a base station 110).

As indicated above, FIG. 4 is provided as an example. Other examples may differ from what is described with respect to FIG. 4.

Figure 5:
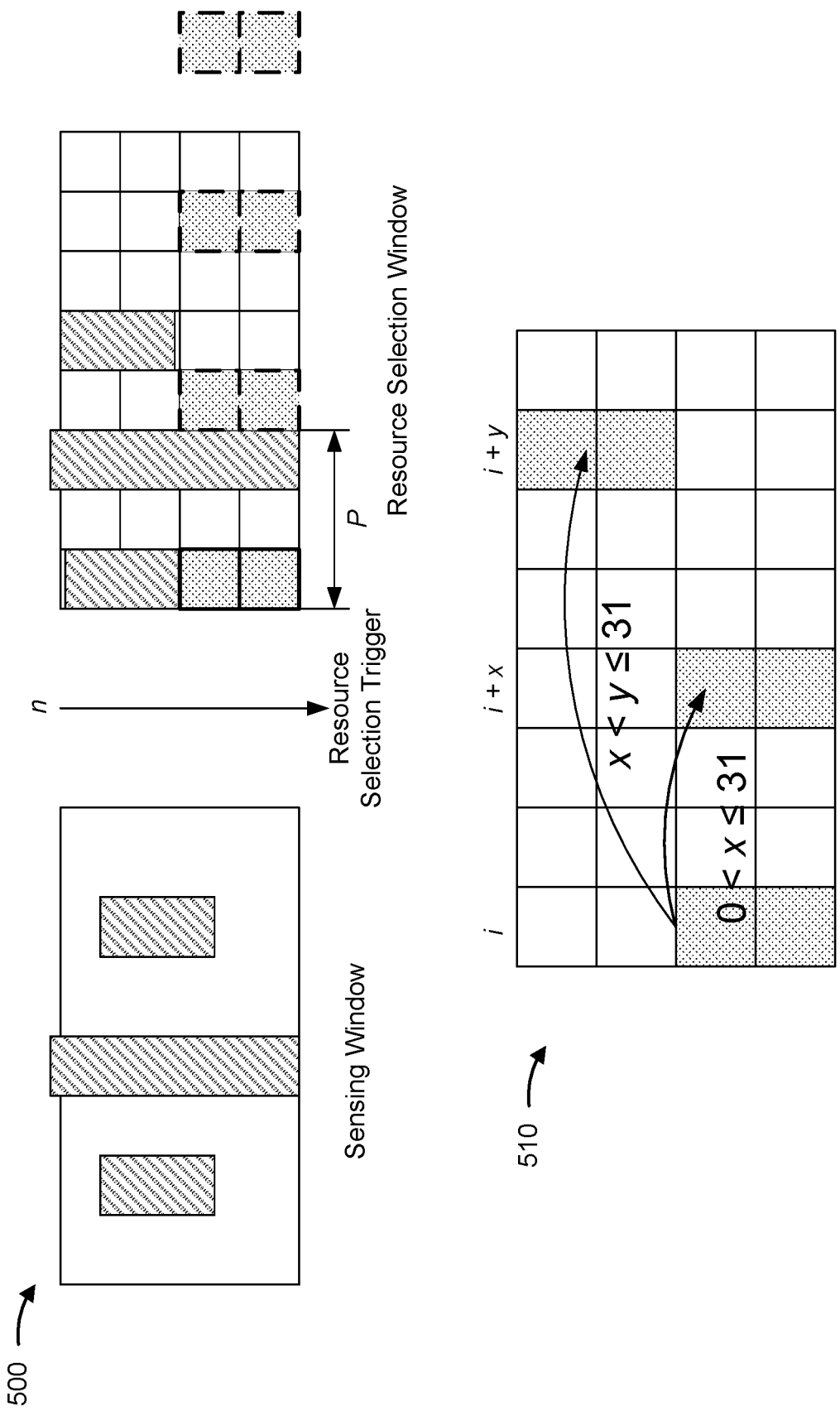
FIG. 5 is a diagram illustrating examples of and of resource allocation for sidelink communications, in accordance with the present disclosure.

FIG. 5 is a diagram illustrating examples 500 and 510 of resource allocation for sidelink communications, in accordance with the present disclosure. In NR, there are two resource allocation modes for V2X sidelink communications. Mode 1 is a centralized mode, in which a base station allocates resources for V2X sidelink communications between UEs. Mode 2 is a distributed mode, in which resource allocations are determined autonomously by a communicating UE (e.g., the transmitting UE). Example 500 shows an example of sensing-based resource selection in Mode 2 resource allocation. Example 510 shows an example of resource reservation in Mode 2 resource allocation.

As shown in example 500, a resource selection trigger for a UE may occur at time n. For example, a packet to be transmitted may arrive in a buffer of the UE. The UE may sense all sidelink communications in a resource pool configured for the UE and decode all of the sidelink communications occurring in a sensing window prior to the time n to identify future resources reserved by the sidelink communications. For example, the sidelink communications in the sensing window may include data and SCI, and the SCI may reserve the future resources in the resource pool. The UE may select resources for transmitting the packet in a resource selection window subsequent to the time n. When selecting the resources in the resource window, the UE may exclude the future resources identified by the sidelink communications in the sensing window. As shown in example 500, the UE may perform periodic resource selection, in which resources are reserved for periodic transmission of the packet with a reservation period P. Alternatively, the UE may perform aperiodic resource selection. The resource pool within the resource selection window may include a set of time/frequency resource blocks, which may include resource blocks for multiple sub-channels in the frequency domain for each of multiple time slots. A resource selected by the UE for transmitting a packet may include one or multiple sub-channels in a time slot.

When performing the resource selection, the UE may will determine a priority indicated in the SCI for with each resource reservation. All reservations from the same UE may be transmitted with the same transmit power. During resource selection, the UE may use different RSRP thresholds for different priorities to determine whether a future resource in the resource selection window is reserved or not. For example, the UE may determine that a resource is reserved (hence, unavailable to the current UE) if a measured RSRP is larger than a corresponding RSRP threshold. If the reservation is for a high priority transmission, then the UE may use a smaller RSRP threshold, as compared to a case in which a reservation is made for a low priority transmission.

As shown in example 510, a UE may use SCI to reserve resources for multiple transmissions of a packet. In NR, a V2X UE may reserve resources for one, two, or three transmissions, and the maximum number of reservations may be configured for the UE. In this case, the resource reservations for transmitting the packet may all have the same number of sub-channels, but the starting sub-channel can differ between reserved resources. As shown in example 510, the UE may include reservations of resources for a second transmission and a third transmission of a packet in SCI transmitted with a first transmission of the packet in slot i. The UE may reserve a resource x slots after slot i in the resource selection window for the second transmission (e.g., 0<x≤31), and the UE may reserve a resource y slots after slot i in the resource selection window for the third transmission (e.g., x<y≤31). In some cases, the transmitting UE may request feedback from the receiving UE for a given packet transmission, and the transmitting UE may elect not to use a reserved resource for re-transmitting the packet based at least in part on the feedback received from the receiving UE. In some cases, the UE may include an indication of a reservation period in the SCI included with the first transmission of the packet in order to reserve a periodically occurring resource for transmitting the packet.

As indicated above, FIG. 5 is provided as an example. Other examples may differ from what is described with respect to FIG. 5.

Sidelink communications are increasingly used for non-vehicular applications, such as smartphones, wearable devices, reduced capability UEs, and/or Industrial Internet of Things (IIoT) UEs, among other examples. In Mode 1, a base station may allocate resources for sidelink communications between UEs. Such centralized sidelink scheduling at the base station may cause delays due to communications between the UEs and the base station to request and grant resources for the sidelink communications. Furthermore, centralized sidelink scheduling at the base station may result in inaccurate resource allocation due to varying channel conditions (e.g., channel state information and/or interference, among other examples) in the sidelink channels. In Mode 2, transmitting UEs may individually perform channel sensing and select resources for transmitting sidelink communications based on the channel sensing. However, such sensing-based resource allocation may consume a large amount of power, which may shorten the battery life of UEs, particularly for non-vehicular UEs. In addition, Mode 2 sidelink resource allocation lacks interference coordination, and therefore increases the likelihood of interference and/or collisions between sidelink communications independently scheduled by different UEs.

Some techniques and apparatuses described herein enable rotating a sidelink scheduler among a group of wireless network devices that includes multiple UEs. In some aspects, a first UE may transmit, to other UEs in the group of wireless network devices, an indication that the first UE is a current sidelink scheduler for the UEs in the group of wireless network devices. The first UE may receive, from a second UE in the group of wireless network devices, a scheduling request for a sidelink communication to be transmitted by the second UE. The first UE may transmit, to the second UE, a grant of resources for the sidelink communication to be transmitted by the second UE. Based at least in part on detecting a trigger to rotate the sidelink scheduler, the first UE may transmit, to another wireless network device in the group of wireless network devices, an indication that the other wireless device is a next sidelink scheduler for the UEs in the group of wireless devices. As a result, delays in sidelink scheduling may be reduced and accuracy of the resource allocation may be increased, as compared with Mode 1 resource allocation, due to a proximity of the current sidelink scheduler to a transmitting UE. Furthermore, a number of UEs performing channel sensing for resource allocation may be reduced, as compared with Mode 2 resource allocation, which may reduce power consumption of the UEs and increase battery life of the UEs. In addition, sidelink scheduling by the current sidelink scheduler may reduce interference and/or collisions between sidelink communications for the UEs.

Figure 6:
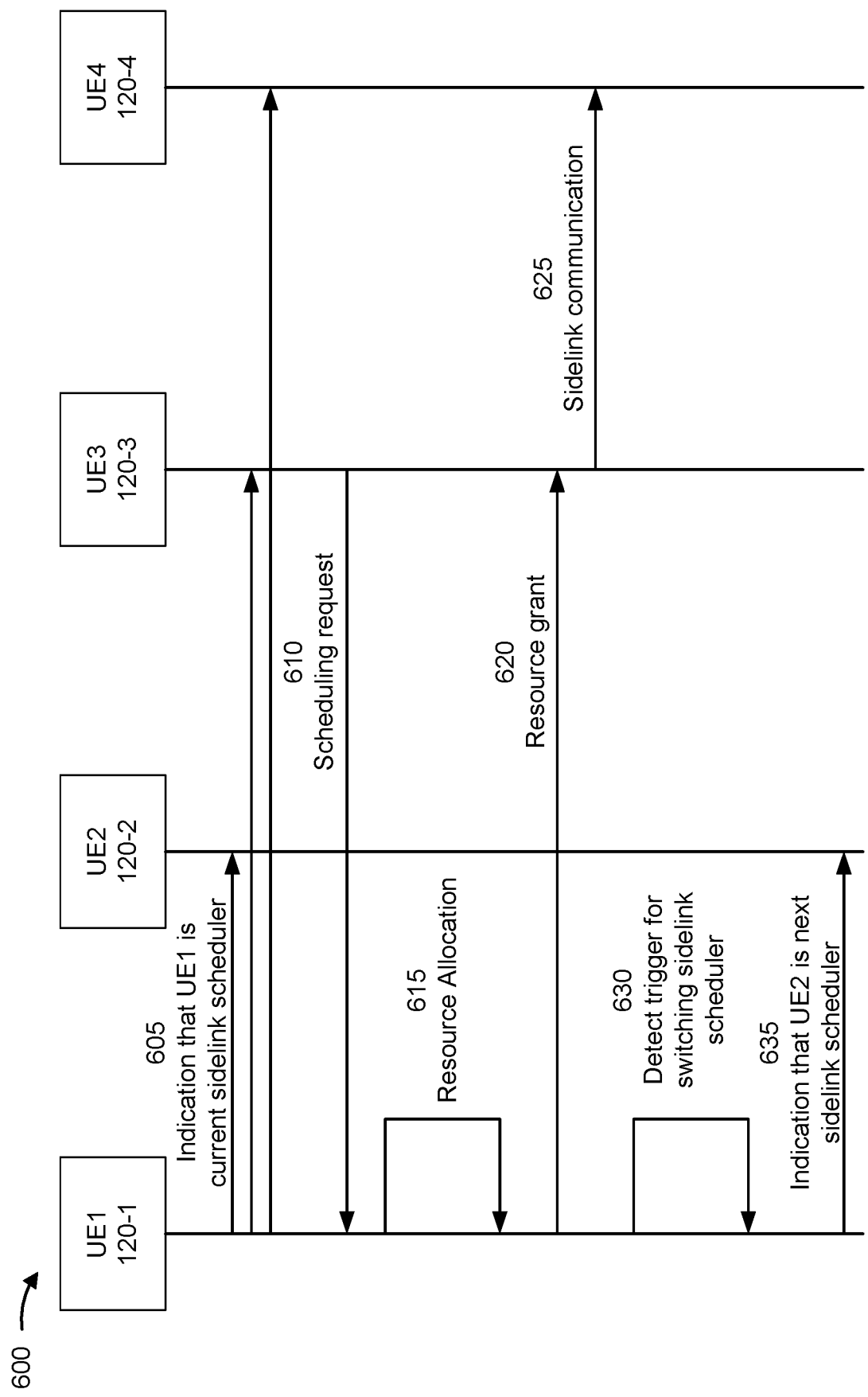
FIGS. 6-10 are diagrams illustrating examples associated with a rotating sidelink scheduler, in accordance with the present disclosure.

FIG. 6 is a diagram illustrating an example 600 associated with a rotating sidelink scheduler, in accordance with the present disclosure. As shown in FIG. 6, example 600 includes communication between a first UE ("UE1") 120-1, a second UE ("UE2") 120-2, a third UE ("UE3") 120-3, and a fourth UE ("UE4") 120-4 (collectively referred to as UEs 120). In some aspects, the UEs 120 may be included in a wireless network, such as wireless network 100. The UEs 120 may communicate via one or more sidelink channels as described elsewhere herein, such as the sidelink communications described with respect to the UEs 305-1 and 305-2. In some aspects, the UEs 120 may be V2X UEs that communicate via a V2X communication network.

In some aspects, the UEs 120 may be included in a group of wireless network devices that share a sidelink scheduler. In some aspects, the wireless network devices in the group of wireless network devices may include UEs (e.g., UE1 120-1, UE2 120-2, UE3 120-3, UE4 120-4, and/or one or more other UEs), one or more base stations (e.g., base station 110), and/or one or more roadside units (RSUs). The wireless networks devices (e.g., UEs, base station(s), and/or RSU(s)) in the group of wireless network devices may be referred to herein as "nodes." The sidelink scheduler is a node (e.g., UE, base station, or RSU) that performs sidelink scheduling (e.g., resource allocation) for sidelink communications transmitted by the UEs (and in some cases SU(s)) in the group of wireless network devices. The sidelink scheduler (e.g., the device that performs sidelink scheduling) may rotate among the nodes of the group of wireless network devices.

As shown in FIG. 6, and by reference number 605, UE1 120-1 may transmit, to the other UEs (e.g., UE2 120-2, UE3 120-3, and UE4 120-4) in the group of wireless network devices, an indication that UE1 120-1 is a current sidelink scheduler for the UEs 120 in the group of wireless network devices. For example, the UE1 120-1 may transmit SCI including the indication that UE1 120-1 is the current sidelink scheduler. In some aspects, UE1 120-1 may groupcast the indication to the other UEs (e.g., UE2 120-2, UE3 120-3, and UE4 120-4) and/or other devices (e.g., base station and/or RSU) in the group of wireless network devices. In some aspects, UE1 120-1 may broadcast the indication to be received by all UEs within a range of UE1 120-1. In some aspects, the broadcast may include information that invites UEs outside the group of wireless network devices to joint the group of wireless network devices. In this case, a UE outside the group may transmit, to UE1 120-1, a request to join the group, and UE1 120-1 may determine whether the UE outside the group. Based at least in part on a new UE joining the group, the current sidelink scheduler (e.g., UE1 120-1) may modify a schedule for rotating the sidelink scheduler and/or negotiate a new scheduler with the UEs in the group (including the new UE).

The current sidelink scheduler (e.g., UE1 120-1) is a node that performs sidelink scheduling for the UEs 120 in the group of wireless network devices during a current time period. In some aspects, UE1 120-1 may transmit the indication at a beginning of a configured time duration for UE1 120-1 to be the sidelink scheduler. In some aspects, UE1 120-1 may transmit the indication that UE1 120-1 is the current sidelink scheduler based at least in part on receiving an indication that the sidelink scheduler is to switch or rotate to UE1 120-1 from a previous sidelink scheduler (e.g., a previous node performing sidelink scheduling for the UEs 120 in the group of wireless network devices). For example, UE1 120-1 may receive (e.g., from the previous sidelink scheduler, a base station, or a lead UE of the UEs 120 in the group of wireless network devices) an indication of a time at which the sidelink scheduler will switch to UE1 120-1. In this case, UE1 120-1 may transmit the indication that UE1 120-1 is the current sidelink scheduler at the time at which the sidelink scheduler switches from the previous sidelink scheduler to UE1 120-1.

In some aspects, instead of or in addition to UE1 120-1 transmitting an indication that UE1 120-1 is the current sidelink scheduler, the indication of the current sidelink scheduler may be implicit for each of the UEs 120 in the group of wireless network. For example, each of the UEs 120 may determine which node is the current sidelink scheduler based at least in part on a configured time and rotation schedule for the sidelink scheduler. In this case, each of the UEs 120 may determine which is node is the current sidelink scheduler based at least in part on the system frame number (SFN) and/or slot number using the configured rotation scheduler for the sidelink scheduler.

As further shown in FIG. 6, and by reference number 610, UE1 120-1 may receive a scheduling request from UE3 120-3. During the time duration in which UE1 120-1 is the current sidelink scheduler, UE1 120-1 may receive scheduling requests from one or more of the other UEs (e.g., UE2 120-2, UE3 120-3, and/or UE4 120-4) in the group of wireless network devices. In some aspects, UE1 120-1 may transmit one or more polling messages to the other UEs to determine whether the other UEs have data to transmit in sidelink communications, and the UE1 120-1 may receive one or more scheduling requests based at least in part on the polling messages. For example, UE3 120-3 may transmit the scheduling request to UE1 120-1 based at least in part on receiving a polling message from UE1 120-1. In some aspects, UE1 120-1 may receive one or more scheduling requests independent of polling messages transmitted by UE1 120-1. For example, UE3 120-3 may transmit the scheduling request to UE1 120-1 based on a determination by UE3 120-3 that UE3 120-3 has data to be transmitted in a sidelink communication, without receiving a polling message from UE1 120-1.

The scheduling request transmitted from UE3 120-3 to UE1 120-1 may be a request for UE1 120-1 (e.g., the current sidelink scheduler) to schedule (allocate resources for) a sidelink communication to be transmitted by UE3 120-3. UE3 120-3 may transmit the scheduling request to UE1 120-1 based at least in part on receiving the indication that UE1 120-1 is the current sidelink scheduler. The scheduling request may include information relating to the sidelink communication to be transmitted, such as a packet size to be transmitted, a priority associated with the data to be transmitted, and/or a traffic profile of the data to be transmitted, among other examples. In some aspects, the scheduling request may include a buffer status report (BSR) for a buffer of UE3 120-3.

As further shown in FIG. 6, and by reference number 615, UE1 120-1 may allocate resources for the sidelink communication to be transmitted by UE3 120-3 based at least in part on receiving the scheduling request from UE3 120-3. During the time duration in which UE1 120-1 is the current sidelink scheduler, UE1 120-1 may allocate resources for sidelink communications to be transmitted by other UEs (e.g., UE2 120-2, UE3 120-3, and/or UE4 120-4) based at least in part on scheduling requests received from the other UEs. During the time duration in which the UE1 120-1 is the current sidelink scheduler, UE1 120-1 may also allocate resources for sidelink communications to be transmitted by UE1 120-1.

In some aspects, the UE1 120-1 may allocate the resources for the sidelink communication to be transmitted by UE3 120-3 (and/or resources for sidelink communications to be transmitted from other UEs in the group of wireless network devices) from a resource pool configured for sidelink communications. UE1 120-1 may allocate resources for one or multiple transmissions of the sidelink communication. In some aspects, UE1 120-1 may select the resources for the sidelink communication to be transmitted by UE3 120-3 (and/or other sidelink communications) from a set of resources granted by a base station for sidelink communications by the UEs 120. The set of resources granted by the base station may be referred to herein as a "Mode 1 sidelink resource set." In this case, resources are allocated from the Mode 1 sidelink resource set by the current sidelink scheduler (e.g., UE1 120-1). In some aspects, UE1 120-1 may receive the Mode 1 sidelink resource set from the base station. For example, UE1 120-1 may transmit a request for resources for sidelink communications to the base station, and the base station may transmit a resource grant (e.g., in downlink control information (DCI)) that includes information identifying the Mode 1 sidelink resource set. In some aspects, UE1 120-1 may receive the Mode 1 sidelink resource set from another UE (e.g., UE2 120-2, UE3 120-3, or UE4 120-4) that received the Mode 1 sidelink resource set from the base station.

In some aspects, UE1 120-1 may select the resources for the sidelink communication to be transmitted by UE3 120-3 (and/or other sidelink communications) from a set of available resources determined based at least in part on channel sensing by a UE. For example, a UE (e.g., UE1 120-1, UE2 120-2, UE3 120-3, or UE4 120-4) may sense all sidelink communications in a resource pool and may decode all of the sidelink communications occurring in a sensing window prior to allocating resources in order to identify future resources reserved in the resource pool. The set of available resources determined based at least in part on channel sensing may be referred to herein as a "Mode 2 sidelink resource set." In this case, resources for sidelink communications for the UEs 120 in the group of wireless network devices may be allocated, by the current sidelink scheduler (e.g., UE1 120-1), from the Mode 2 sidelink resource set determined based at least in part on channel sensing by a single UE in the group of wireless network devices (or a subset of UEs including fewer UEs than a total number of UEs in the group of wireless network devices). In some aspects, UE1 120-1 (e.g., the current sidelink scheduler) may perform the channel sensing to determine the Mode 2 sidelink resource set. In some aspects, another UE (e.g., UE2 120-2, UE3, or UE4 120-4) may perform channel sensing to determine the Mode 2 sidelink resource set, and UE1 120-1 may receive the Mode 2 sidelink resource set from the other UE (e.g., UE2 120-2, UE3 120-3, or UE4 120-4).

In some aspects, UE1 120-1 may manage a Mode 1 sidelink resource set and a Mode 2 sidelink resource set. In this case, UE1 120-1 may select which resource set to use to allocate the resources for the sidelink communication to be transmitted by UE3 120-3 based at least in part on the availability of resources in the resource sets, the packet size to be transmitted in the sidelink communication, and/or the priority associated with the data to be transmitted in the sidelink communication, among other examples.

As further shown in FIG. 6, and by reference number 620, UE1 120-1 may transmit, to UE3 120-3, a resource grant for the sidelink communication to be transmitted by UE3 120-3. The resource grant may include an indication of the resources allocated for UE3 120-3 to transmit the sidelink communication. For example, the resource grant may include SCI that schedules transmission of the sidelink communication by UE3 120-3. The resource grant may include resources allocated for a single transmission of the sidelink communication or multiple transmissions of the sidelink communication. In some aspects, UE1 120-1 may transmit the resource grant in at least one of a unicast transmission to UE3 120-3, a groupcast transmission to the UEs 120 in the group of wireless network devices, and/or a broadcast transmission to all UEs in a range of UE1 120-1.

As further shown in FIG. 6, and by reference number 625, UE3 120-3 may transmit the sidelink communication using the resources indicated in the resource grant received from UE1 120-1. For example, UE3 120-3 may transmit the sidelink communication to UE4 120-4 using the resources indicated in the resource grant. In some aspects, UE3 120-3 may transmit a single transmission of the sidelink communication to UE4 120-4 using the resources indicated in the resource grant. In some aspects, UE3 120-3 may transmit multiple transmissions of the sidelink communication to UE4 120-4 using the resources indicated in the resource grant.

As further shown in FIG. 6, and by reference number 630, UE1 120-1 may detect a trigger for switching the sidelink scheduler to another node in the group of wireless network devices. In some aspects, UE1 120-1 may detect the trigger for switching the sidelink scheduler based at least in part on a time duration associated with UE1 120-1 being the current sidelink scheduler. For example, UE1 120-1 may be configured to switch/rotate the sidelink scheduler to another node in the group of wireless network devices after the time duration associated with UE1 120-1. In this case, UE1 120-1 may detect the trigger for switching upon expiration of the time duration or when a certain amount of time remains in the time duration.

In some aspects, the trigger for switching the sidelink scheduler to another node in the group of wireless network devices may be based at least in part on a change in at least one of network topology or channel conditions. For example, UE1 120-1 may detect the change in network topology and/or channel conditions, or UE1 120-1 may receive an indication of the change in network topology and/or channel conditions from another node (e.g., another UE or a base station). In some aspects, UE1 120-1 may detect the trigger for switching the sidelink scheduler to another node in the group of wireless network devices based at least in part on receiving an indication (e.g., from a base station or another UE in the group of wireless network devices) to switch the sidelink scheduler to another node. For example, the indication may indicate a time at which the sidelink scheduler is to switch to another node and/or identify which node is to be the next sidelink scheduler.

As further shown in FIG. 6, and by reference number 635, based at least in part on detecting the trigger for switching the sidelink scheduler, UE1 120-1 may transmit, to UE2 120-2, an indication that UE2 120-2 is the next sidelink scheduler. The next sidelink scheduler (e.g., UE2 120-2) is a device/node that performs sidelink scheduling for the UEs 120 in the group of wireless network devices in a time period subsequent to the current time period in which the current sidelink scheduler (e.g., UE1 120-1) performs the sidelink scheduling. In some aspects, UE1 120-1 may transmit the indication that UE2 120-2 is the next sidelink scheduler prior to an end of the time period in which UE1 120-1 is the current sidelink scheduler. In this case, the indication may indicate a time at which the sidelink scheduler will switch to UE2 120-2.

In some aspects, the indication may be included in SCI transmitted by UE1 120-1. In some aspects, the indication may include a token (e.g., a sequence of bits) associated with the sidelink scheduler. For example, the token may be passed from node to node to indicate which node is the sidelink scheduler. In some aspects, the token may be negotiated and encrypted (also time-varying), and thus only understood by the UEs 120 in the group of wireless network devices. The token may act as a key to decoding any sidelink scheduler related information, such that sidelink scheduler related information can be decoded only after the token is correctly decoded. In some aspects, UE1 120-1 may transmit, to UE2 120-2 with the indication, information identifying a resource set (e.g., a Mode 1 sidelink resource set and/or a Mode 2 sidelink resource set), channel sensing information from channel sensing performed by UE1 120-1 or another UE, and/or scheduling status for scheduled sidelink communications.

In some aspects, the UE1 120-1 may determine that UE2 120-2 is the next sidelink scheduler based on a configured sidelink scheduler rotation. In some aspects, UE1 120-1 may determine that UE2 120-2 is the next sidelink scheduler based on receiving an indication (e.g., from a base station or another UE) that UE2 120-2 is the next sidelink scheduler. For example, a base station or a lead UE of the UEs 120 in the group of wireless network devices may determine the next sidelink scheduler (e.g., UE2 120-2) based at least in part on network topology and/or channel conditions. In some aspects, UE1 120-1 may determine the next sidelink scheduler (e.g., UE2 120-2) based at least in part on network topology and/or channel conditions. In some aspects, the next sidelink scheduler may be determined based on a UE (e.g., UE2 120-2) transmitting a request to be the next sidelink scheduler to the current sidelink scheduler (e.g., UE1 120-1), a base station in the group of wireless network devices, an RSU in the group of wireless network devices, or a lead UE of the UEs 120 in the group of wireless network devices.

As described above in connection with FIG. 6, a sidelink scheduler may rotate among a group of wireless network devices that includes multiple UEs. A UE (e.g., UE1 120-1) may transmit, to other UEs in the group of wireless network devices, an indication that the UE is the current sidelink scheduler for the UEs in the group of wireless network devices. The UE may receive, from another UE (e.g., UE3 120-3) in the group of wireless network devices, a scheduling request for a sidelink communication to be transmitted by the other UE. The UE may transmit, to the other UE, a grant of resources for the sidelink communication to be transmitted by the other UE. Based at least in part on detecting a trigger to rotate the sidelink scheduler, the UE may transmit, to another node (e.g., UE2 120-2) in the group of wireless network devices, an indication that the other node is a next sidelink scheduler for the UEs in the group of wireless devices. As a result, delays in sidelink scheduling may be reduced and accuracy of the resource allocation may be increased, as compared with Mode 1 resource allocation. Furthermore, a number of UEs performing channel sensing for resource allocation may be reduced, which may reduce power consumption of the UEs and increase battery life of the UEs. In addition, sidelink scheduling by the current sidelink scheduler may reduce interference and/or collisions between sidelink communications for the UEs.

As indicated above, FIG. 6 is provided as an example. Other examples may differ from what is described with respect to FIG. 6.

Figure 7:
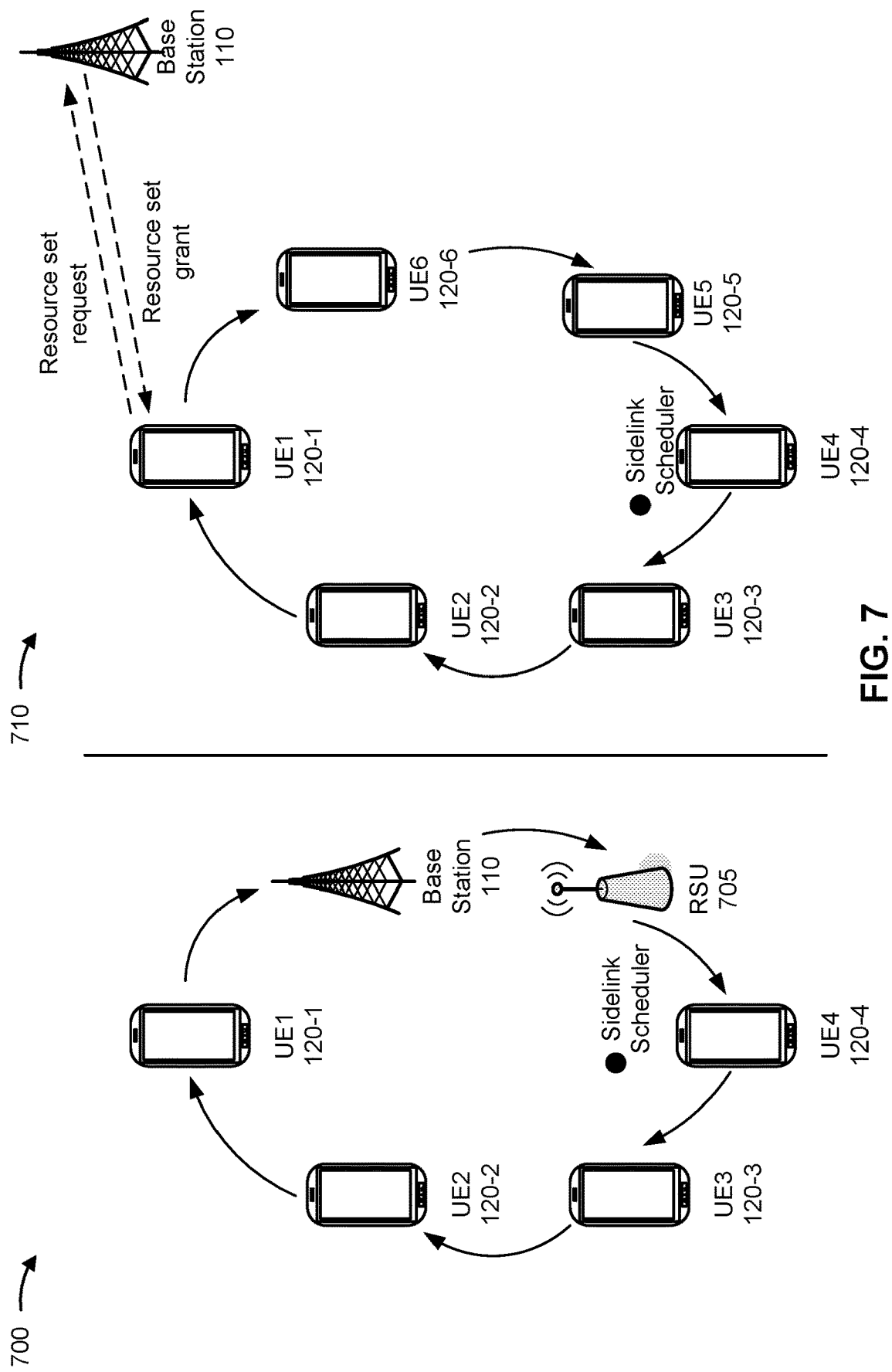

FIG. 7 is a diagram illustrating examples 700 and 710 associated with a rotating sidelink scheduler, in accordance with the present disclosure. As shown in FIG. 7, example 700 shows a group of wireless network devices that includes a first UE ("UE1") 120-1, a second UE ("UE2") 120-2, a third UE ("UE3") 120-3, a fourth UE ("UE4") 120-4 (collectively referred to as UEs 120), a base station 110, and an RSU 705. The group of wireless network devices, including the UEs 120, the base station 110, and the RSU 705, may share a sidelink scheduler to schedule sidelink communications for the UEs 120. As shown by the arrows in example 700, the sidelink scheduler may to rotate among the nodes (e.g., UEs 120, base station 110, and RSU 705) of the group of wireless network devices. For example, UE4 120-4 may be a current sidelink scheduler, and the sidelink scheduler may next switch to UE3 120-3, then UE2 120-2, then UE1 120-1, then base station 110, then RSU 705, before returning to UE4 120-4.

In some aspects, the sidelink scheduler may switch nodes in the group of wireless network devices at a regular time interval. In some aspects, the sidelink scheduler may switch nodes based at least in part on a respective time duration associated with each node. In some aspects, the sidelink scheduler may switch nodes based at least in part on a dynamic selection (e.g., performed by the base station 110 or one of the UEs 120) of a node to be the sidelink scheduler. In some aspects, all nodes in the group of wireless network devices are aware of the other nodes in the group. As shown in example 700, the group of wireless network devices may share a single sidelink scheduler (e.g., one node is the sidelink scheduler at a time). In some aspects, the group of wireless network devices may include multiple sidelink schedulers (e.g., a first sidelink scheduler and a second sidelink scheduler). This may increase reliability of the sidelink scheduling by avoiding a single point of failure.

The current sidelink scheduler in the group of wireless network devices may allocate resources for sidelink communications for all of the UEs 120 in the group, as described above in connection with FIG. 6. In example 700, the base station 110 is part of the group of wireless network devices. In this case, the base station 110 may transmit a Mode 1 sidelink resource set to the node that is the current sidelink scheduler, and the current sidelink scheduler may allocate resources for sidelink communications from the Mode 1 sidelink resource set.

As further shown in FIG. 7, example 710 shows a group of wireless network devices that includes a first UE ("UE1") 120-1, a second UE ("UE2") 120-2, a third UE ("UE3") 120-3, a fourth UE ("UE4") 120-4, a fifth UE ("UE5") 120-5, and a sixth UE ("UE6") 120-6 (collectively referred to as UEs 120). The group of wireless network devices may share a sidelink scheduler to schedule sidelink communications for the UEs 120. As shown by the arrows in example 710, the sidelink scheduler may to rotate among the UEs. For example, UE4 120-4 may be a current sidelink scheduler, and the sidelink scheduler may next switch to UE3 120-3, then UE2 120-2, then UE1 120-1, then UE6 120-6, then UE5 120-5, before returning to UE4 120-4. As shown in example 710, in some aspects, the group of wireless network devices may not include a base station (e.g., base station 110).

In some aspects, in a case in which the group of wireless network devices does not include the base station 110, a UE (e.g., UE1 120-1) in a coverage area of the base station 110 may transmit, to the base station 110, a request for a Mode 1 sidelink resource set for the UEs 120 in the group of wireless network devices. The base station 110 may transmit, to the UE (e.g., UE1 120-1) a resource set grant that identifies the Mode 1 sidelink resource set for the UEs 120 in the group of wireless network devices. In this case, the UE (e.g., UE1 120-1) may transmit information identifying the Mode 1 sidelink resource set to the current sidelink scheduler, and the current sidelink scheduler may allocate resources for sidelink communications from the Mode 1 sidelink resource set.

In some aspects, in a case in which the group of wireless network devices does not include the base station 110, the current sidelink scheduler may allocate resources for sidelink communications from a Mode 2 sidelink resource set determined based at least in part on channel sensing performed by one of the UEs 120. In some aspects, the UE that performs the channel sensing to determine the Mode 2 sidelink resource set may be the same UE as the current sidelink scheduler (e.g., UE4 120-4). In some aspects, the UE that performs the channel sensing to determine the Mode 2 sidelink resource set may be a different UE from the current sidelink scheduler. In this case, the UE that performs the channel sensing may also rotate among the UEs 120 in the group of wireless network devices. This may provide a benefit in reducing power consumption, and thus increasing battery life, for the UEs 120 in the group of wireless network devices.

As indicated above, FIG. 7 is provided as an example. Other examples may differ from what is described with respect to FIG. 7.

Figure 8:
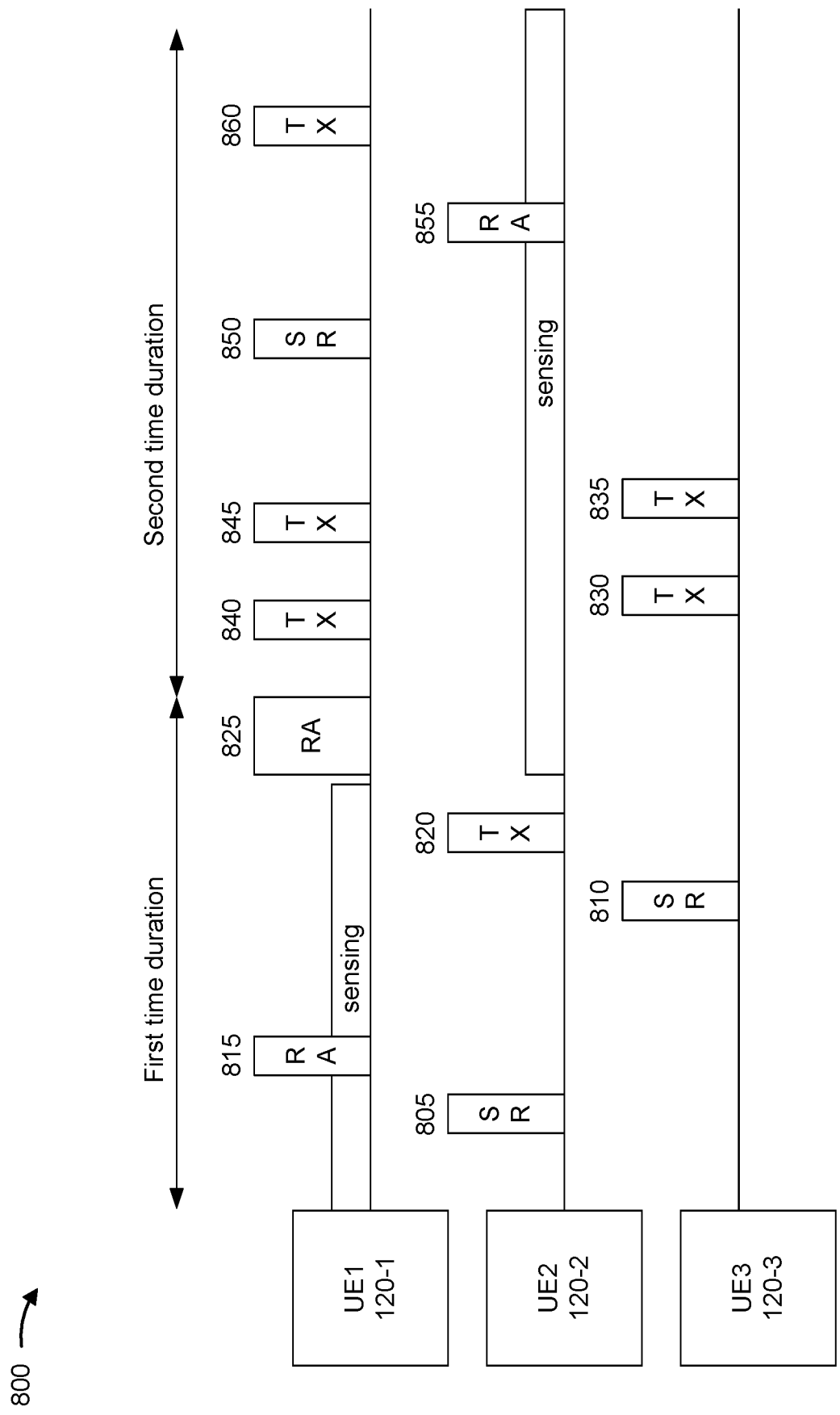

FIG. 8 is a diagram illustrating an example 800 associated with a rotating sidelink scheduler, in accordance with the present disclosure. As shown in FIG. 8, example 800 includes communication between a first UE ("UE1") 120-1, a second UE ("UE2") 120-2, a third UE ("UE3") 120-3 (collectively referred to as "UEs 120"). The UEs 120 may be included in a group of wireless network devices that share a sidelink scheduler for scheduling sidelink communications for the UEs 120. As shown in FIG. 8, the sidelink scheduler may allocate resources for sidelink communications from a Mode 2 sidelink resource set determined based at least in part on channel sensing. For example, the UEs 120 in FIG. 8 may be UEs that are not in a coverage area of a base station.

As shown in FIG. 8, UE1 120-1 may be the sidelink scheduler during a first time duration, and UE2 120-2 may be the sidelink scheduler during a second time duration. UE1 120-1 may perform channel sensing during the first time duration to determine the Mode 2 sidelink resource set for allocating resources for sidelink communications. UE2 120-2 may perform channel sensing during the second time duration to determine the Mode 2 sidelink resource set for allocating resources for sidelink communications.

As further shown in FIG. 8, during the first time duration, UE1 120-1 may receive scheduling request 805 from UE2 120-2 and scheduling request 810 from UE3 120-3. UE1 120-1 may transmit, during the first time duration, resource allocation 815, which may indicate resources allocated for transmission 820 of a sidelink communication from UE2 120-2 based at least in part on scheduling request 805. UE1 120-1 may also transmit, during the first time duration, resource allocation 825, which may indicate resources allocated for transmissions 830 and 835 of a sidelink communication from UE3 120-3 based at least in part on scheduling request 810. Resource allocation 825 may also indicate resources allocated for transmissions 840 and 845 of a sidelink communication from UE 1. For example, UE1 120-1 may select the resources allocated in resource allocations 815 and 825 from the Mode 2 sidelink resource set determined based on the channel sensing performed by UE1 120-1 for the first time duration.

At an end of the first time duration, UE1 120-1 may transmit a final resource allocation (e.g., resource allocation 825), and UE1 120-1 may transmit, to UE2 120-2 (e.g., the next sidelink scheduler), channel sensing information and/or scheduling status/history information. Because the channel sensing precedes resource allocation, in some aspects, UE1 120-1 may stop performing channel sensing prior to the end of the first time duration. In some aspects, UE2 120-2 may begin performing channel sensing prior to the beginning of the second time duration, such that UE2 120-2 may begin resource allocation at the beginning of the second time duration. For example, UE2 120-2 may begin channel sensing when UE1 120-1 stops channel sensing. In some aspects, UE2 120-2 may receive, from UE 1 prior to the end of the first time duration, an indication that UE2 120-2 is the next sidelink scheduler. In this case, UE2 120-2 may begin performing channel sensing based at least in part on receiving the indication from UE1 120-1.

As further shown in FIG. 8, during the second time duration, UE2 120-2 may receive, from UE1 120-1, scheduling request 850. UE2 120-2 may transmit, during the second time duration, resource allocation 855, which may indicate resources allocated for transmission 860 of a sidelink communication from UE1 120-1. For example, UE2 120-2 may select the resources allocated in resource allocation 855 from the Mode 2 sidelink resource set determined based on the channel sensing performed UE2 120-2 for the second time duration.

As shown in FIG. 8, in some aspects, when UE1 120-1 is performing channel sensing for the first time duration, UE2 120-2 and UE3 120-3 may not perform channel sensing. Similarly, when UE2 120-2 is performing channel sensing for the second time duration, UE1 120-1 and UE3 120-3 may not perform channel sensing. This may result in reduced power consumption for UE2 120-2 and UE3 120-3 in the first time duration and for UE1 120-1 and UE3 120-3 in the second time duration. In some aspects, one or more UEs other than the UE that is the current sidelink scheduler may perform channel sensing instead of the UE that is the current sidelink scheduler. In some aspects, one or more UEs other than the UE that is the current sidelink scheduler may perform a reduced channel sensing procedure in order to assist the current sidelink scheduler. For example, the reduced channel sensing procedure may include the UE performing blind decoding and sensing in a reduced bandwidth (e.g., a sub-set of sub-channels) and/or in a reduced number of slots, as opposed to blind decoding in all sub-channels and in all slots in a full channel sensing procedure. This may also result in reduced power consumption for the UEs, as compared to each UE performing the full channel sensing procedure.

As indicated above, FIG. 8 is provided as an example. Other examples may differ from what is described with respect to FIG. 8.

Figure 9:
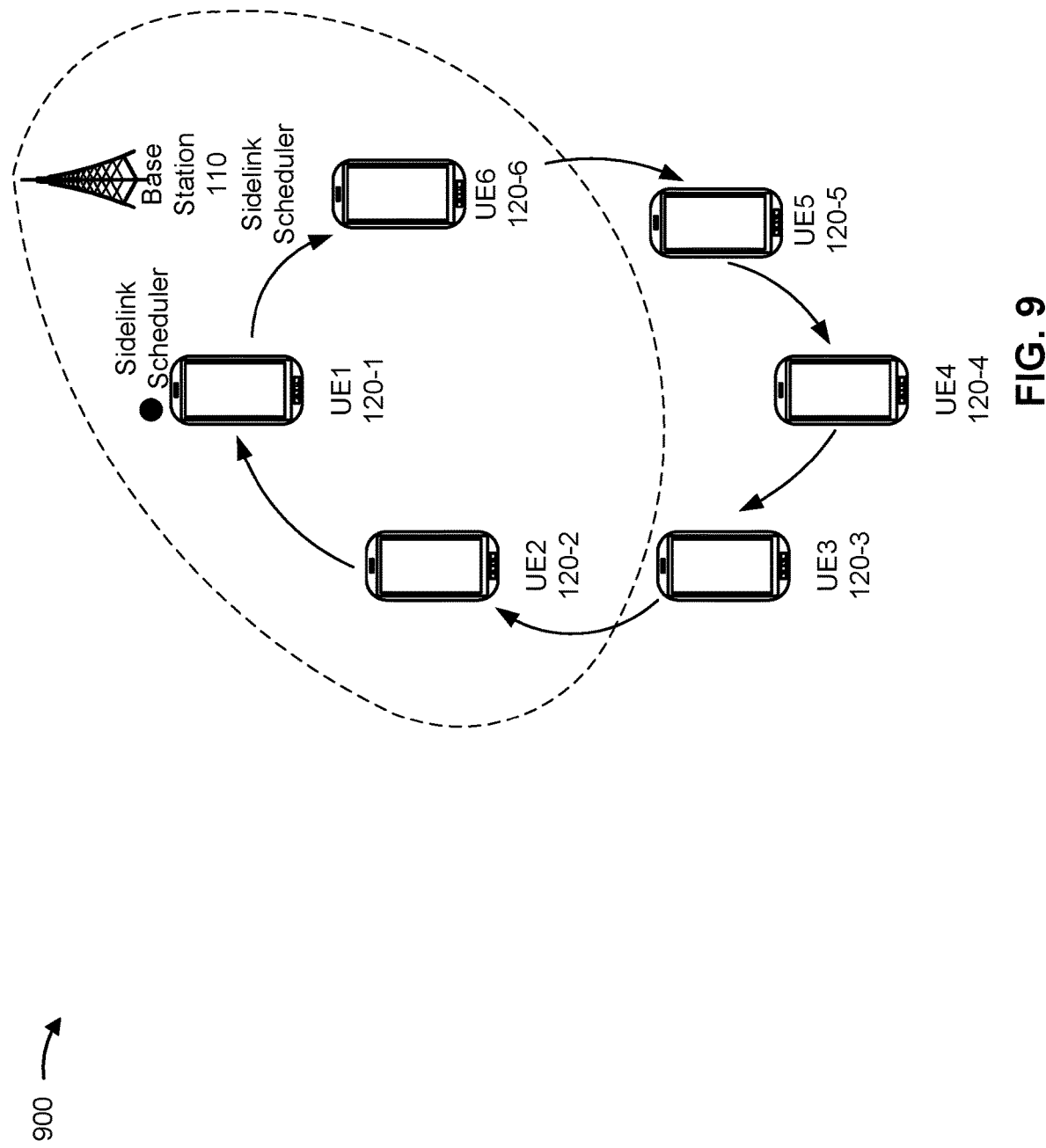

FIG. 9 is a diagram illustrating an example 900 associated with a rotating sidelink scheduler, in accordance with the present disclosure. As shown in FIG. 9, example 900 shows a group of wireless network devices that includes a first UE ("UE1") 120-1, a second UE ("UE2") 120-2, a third UE ("UE3") 120-3, a fourth UE ("UE4") 120-4, a fifth UE ("UE5") 120-5, and a sixth UE ("UE6") 120-6 (collectively referred to as UEs 120). The group of wireless network devices may share a sidelink scheduler to schedule sidelink communications for the UEs 120. As shown by the arrows in example 900, the sidelink scheduler may to rotate among the UEs.

As shown in FIG. 9, the group of wireless network devices may include some UEs (e.g., UE1 120-1, UE2 120-2, and UE6 120-6) that are in a coverage area associated with a base station 110, and some UEs (e.g., UE3 120-3, UE4 120-4, and UE5 120-5) that are not the coverage area associated with the base station 110. In some aspects, such as in a case in which some UEs are in the coverage area of the base station 110, and some UEs are not in the coverage area of the base station 110, the sidelink scheduler (e.g., UE1 120-1) may jointly manage a Mode 1 sidelink resource set and a Mode 2 sidelink resource set.

One or more of the UEs in the coverage area (e.g., UE1 120-1, UE2 120-2, and/or UE6 120-6) may transmit a request, to the base station 110, for the Mode 1 sidelink resource set, and receive a grant of the Mode 1 sidelink resource set from the base station 110. In some aspects, one or more of the UEs in the coverage area (e.g., UE1 120-1, UE2 120-2, and/or UE6 120-6) may transmit, to the base station 110, a request to modify the Mode 1 sidelink resource set granted by the base station 110. For example, the request to modify the Mode 1 sidelink resource set may include at least one of a request to cancel resources in the Mode 1 sidelink resource set or a request to add resources to the Mode 1 sidelink resource set. The base station 110 may transmit, to one or more UEs in the coverage area (e.g., UE1 120-1, UE2 120-2, and/or UE6 120-6), a modified Mode 1 sidelink resource set based on the request to modify the Mode 1 sidelink resource set. In a case in which the current sidelink scheduler is one of the UEs not in the coverage area (e.g., UE3 120-3, UE4 120-4, or UE5 120-5), one of the UEs in the coverage area (e.g., UE1 120-1, UE2 120-2, or UE6 120-6) may transmit the Mode 1 sidelink resource set to the current sidelink scheduler.

In some aspects, the current sidelink scheduler may perform channel sensing to determine and/or modify the Mode 2 sidelink resource set. In some aspects, the current sidelink scheduler may request sensing information from another UE in the group of wireless network devices, and determine and/or modify the Mode 2 sidelink resource set based at least in part on the sensing information received from the other UE. In some aspects, in a case in which the current sidelink scheduler is a UE in the coverage area of the base station 110 (e.g., UE1 120-1, UE2 120-2, or UE6 120-6), the current sidelink scheduler may request sensing information from one or more UEs not in the coverage area (e.g., UE3 120-3, UE4 120-4, and/or UE5 120-5) modifying the Mode 2 sidelink resource set.

In some aspects, the sidelink scheduler jointly manages the Mode 1 sidelink resource set and the Mode 2 sidelink resource set, and the sidelink scheduler may allocate resources for sidelink communications (for any of the UEs 120) from the Mode 1 sidelink resource set or from the Mode 2 sidelink resource set. In some aspects, the sidelink scheduler may select which resource set to use to allocate the resources for a sidelink communication based at least in part on the availability of resources in the resource sets, the packet size to be transmitted in the sidelink communication, and/or the priority associated with the data to be transmitted in the sidelink communication, among other examples. For example, the sidelink scheduler may allocate resources from the Mode 1 sidelink resource set for sidelink communications associated with a first priority (e.g., high priority traffic), and the sidelink scheduler may allocate resources from the Mode 2 sidelink resource set for sidelink communications associated with a second priority (e.g. low priority traffic).

As indicated above, FIG. 9 is provided as an example. Other examples may differ from what is described with respect to FIG. 9.

Figure 10:
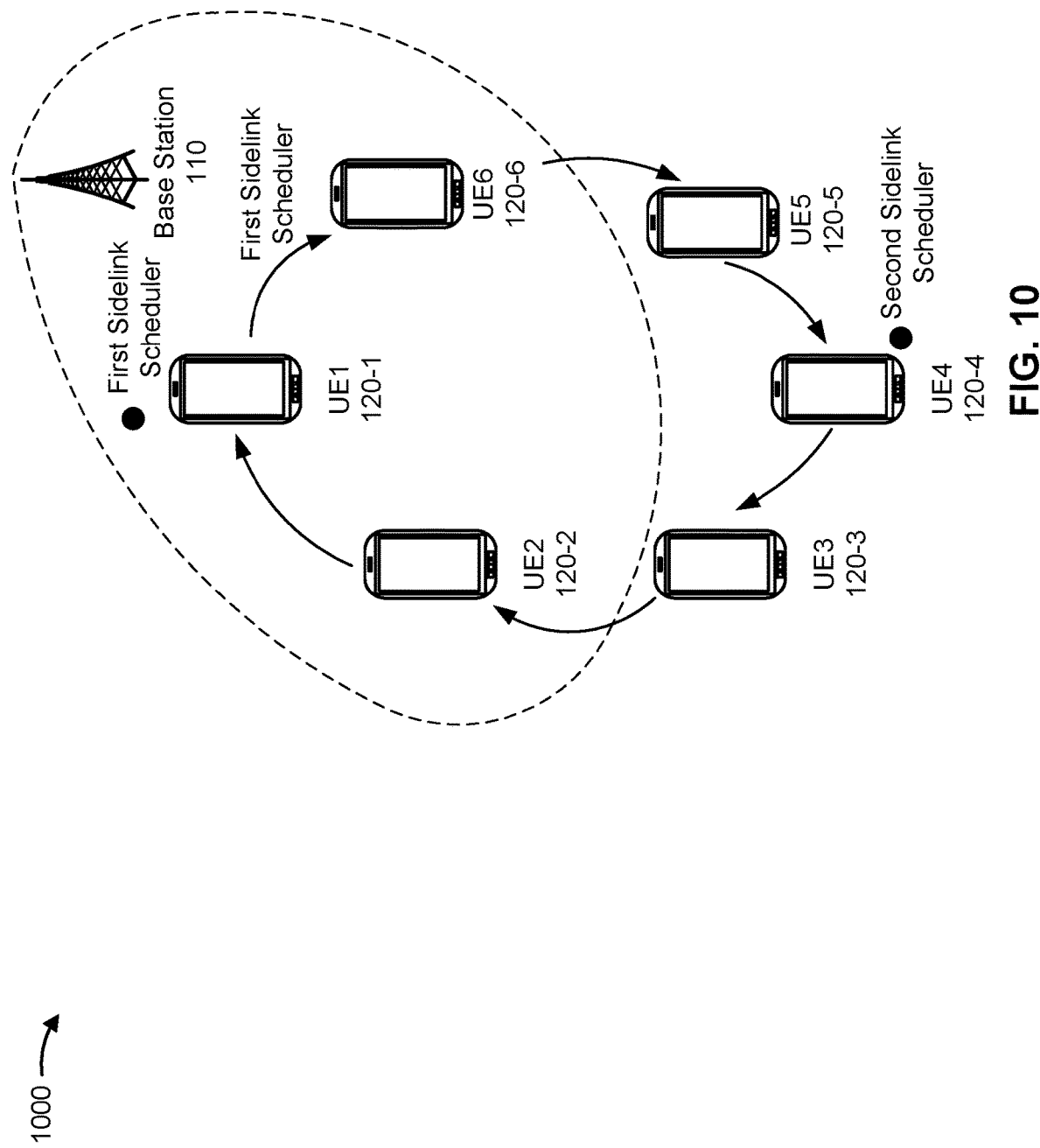

FIG. 10 is a diagram illustrating an example 1000 associated with a rotating sidelink scheduler, in accordance with the present disclosure. As shown in FIG. 10, example 1000 shows a group of wireless network devices that includes a first UE ("UE1") 120-1, a second UE ("UE2") 120-2, a third UE ("UE3") 120-3, a fourth UE ("UE4") 120-4, a fifth UE ("UE5") 120-5, and a sixth UE ("UE6") 120-6 (collectively referred to as UEs 120). The group of wireless network devices may include some UEs (e.g., UE1 120-1, UE2 120-2, and UE6 120-6) that are in a coverage area associated with a base station 110, and some UEs (e.g., UE3 120-3, UE4 120-4, and UE5 120-5) that are not the coverage area associated with the base station 110.

As shown in FIG. 10, in some aspects, such as in a case in which some UEs are in the coverage area of the base station 110 and some UEs are not in the coverage area of the base station 110, the group of wireless network devices may share a first sidelink scheduler and a second sidelink scheduler. For example, the first sidelink scheduler may manage (e.g., allocate resources from) a Mode 1 sidelink resource set, and the second sidelink scheduler may manage (e.g., allocate resources from) a Mode 2 sidelink resource set. In some aspects, the first sidelink scheduler may be a UE (e.g., UE1 120-1) in the coverage are of the base station 110, and the second sidelink scheduler may be a UE (e.g., UE4 120-4) outside of the coverage area of the base station 110. In this case, the rotations/switching of the sidelink schedulers may be configured such that one sidelink scheduler is a UE in the coverage area (e.g., UE1 120-1, UE2 120-2, or UE6 120-6) and another sidelink scheduler is a UE outside the coverage area (e.g., UE3 120-3, UE4 120-4, or UE5 120-5) when rotation of the sidelink schedulers occurs.

In some aspects, a transmitting UE (e.g., a UE requesting resources for transmitting a sidelink communication) may request resources from either one of the first sidelink scheduler (e.g., UE1 120-1) or the second sidelink scheduler (e.g., UE4 120-4). For example, even if the transmitting UE is outside of the coverage area of the base station 110, the transmitting UE may request resources from the first sidelink scheduler (e.g., resources from the Mode 1 sidelink resource set). In some aspects, the transmitting UE may select whether to transmit a scheduling request to the first sidelink scheduler or the second sidelink scheduler based at least in part between a comparison of a first distance between the transmitting UE and the current first sidelink scheduler UE (e.g., UE1 120-1) and a second distance between the transmitting UE and the current second sidelink scheduler UE. In some aspects, the transmitting UE may select whether to transmit a scheduling request to the first sidelink scheduler or the second sidelink scheduler based at least in part between a comparison of a first path loss between the transmitting UE and the current first sidelink scheduler UE (e.g., UE1 120-1) and a second path loss between the transmitting UE and the current second sidelink scheduler UE.

In some aspects, the transmitting UE may select whether to transmit a scheduling request to the first sidelink scheduler or the second sidelink scheduler based at least in part on a priority associated with the sidelink communication to be transmitted by the transmitting UE. For example, the transmitting UE may transmit a scheduling request for a sidelink communication associated with a first priority (e.g., high priority traffic) to the first sidelink scheduler (e.g., to request resources from the Mode 1 sidelink resource set), and the transmitting UE may transmit a scheduling request for a sidelink communication associated with a second priority (e.g., low priority traffic) to the second sidelink scheduler (e.g., to request resources from the Mode 2 sidelink resource set).

In some aspects, the first sidelink scheduler and the second sidelink scheduler may communicate with each other to determine resources available in the resource set managed by the other sidelink scheduler. In some aspects, the first sidelink scheduler may transmit, to the second sidelink scheduler, a request for resources in the Mode 2 sidelink resource set managed by the second sidelink scheduler. The second sidelink scheduler may transmit, to the first sidelink scheduler, an indication of available resources in the Mode 2 sidelink resource management set. For example, the first sidelink scheduler may request resources from the second sidelink scheduler based at least in part on a determination that the resources in the Mode 1 sidelink resource set are insufficient to allocate resources for a scheduling request. In this case, the first sidelink scheduler may allocate resources from the Mode 2 sidelink resource set (or send the scheduling request to the second sidelink scheduler to allocate resources from the Mode sidelink resource set) based at least in part on a determination, from the indication of available resources received from the second sidelink scheduler, that there are sufficient resources available in the Mode 2 sidelink resource set.

In some aspects, the second sidelink scheduler may transmit, to the first sidelink scheduler, a request for resources in the Mode 1 sidelink resource set managed by the first sidelink scheduler. The first sidelink scheduler may transmit, to the second sidelink scheduler, an indication of available resources in the Mode 1 sidelink resource management set. In some aspects, the second sidelink scheduler may determine, based at least in part on the indication of available resources in the Mode 1 sidelink resource set, whether the available resources in the Mode 1 sidelink resource set are sufficient for all sidelink communications for the UEs 120 in the group of wireless network devices. For example, the second sidelink scheduler may determine the available resources in the Mode 1 sidelink resource set are sufficient for the UEs 120 based at least in part on a determination of whether the available resources in the Mode 1 sidelink resource set satisfy a threshold. Based at least in part on a determination that the available resources in the Mode 1 sidelink resource set are sufficient for the UEs 120 (e.g., a determination that the Mode 2 resource set is not currently needed), the second sidelink scheduler may allocate resources from the Mode 1 sidelink resource set. In this case, the second sidelink scheduler may perform a reduced channel sensing procedure (e.g., "light" channel sensing), and allocate resources from the Mode 1 sidelink resource set based at least in part on the reduced channel sensing procedure. For example, the reduced channel sensing procedure may include the second sidelink scheduler UE performing blind decoding and sensing in a reduced bandwidth (e.g., a sub-set of sub-channels) and/or in a reduced number of slots, as opposed to blind decoding in all sub-channels and in all slots in a full channel sensing procedure. This may result in reduced power consumption for the second sidelink scheduler UE.

As indicated above, FIG. 10 is provided as an example. Other examples may differ from what is described with respect to FIG. 10.

Figure 11:
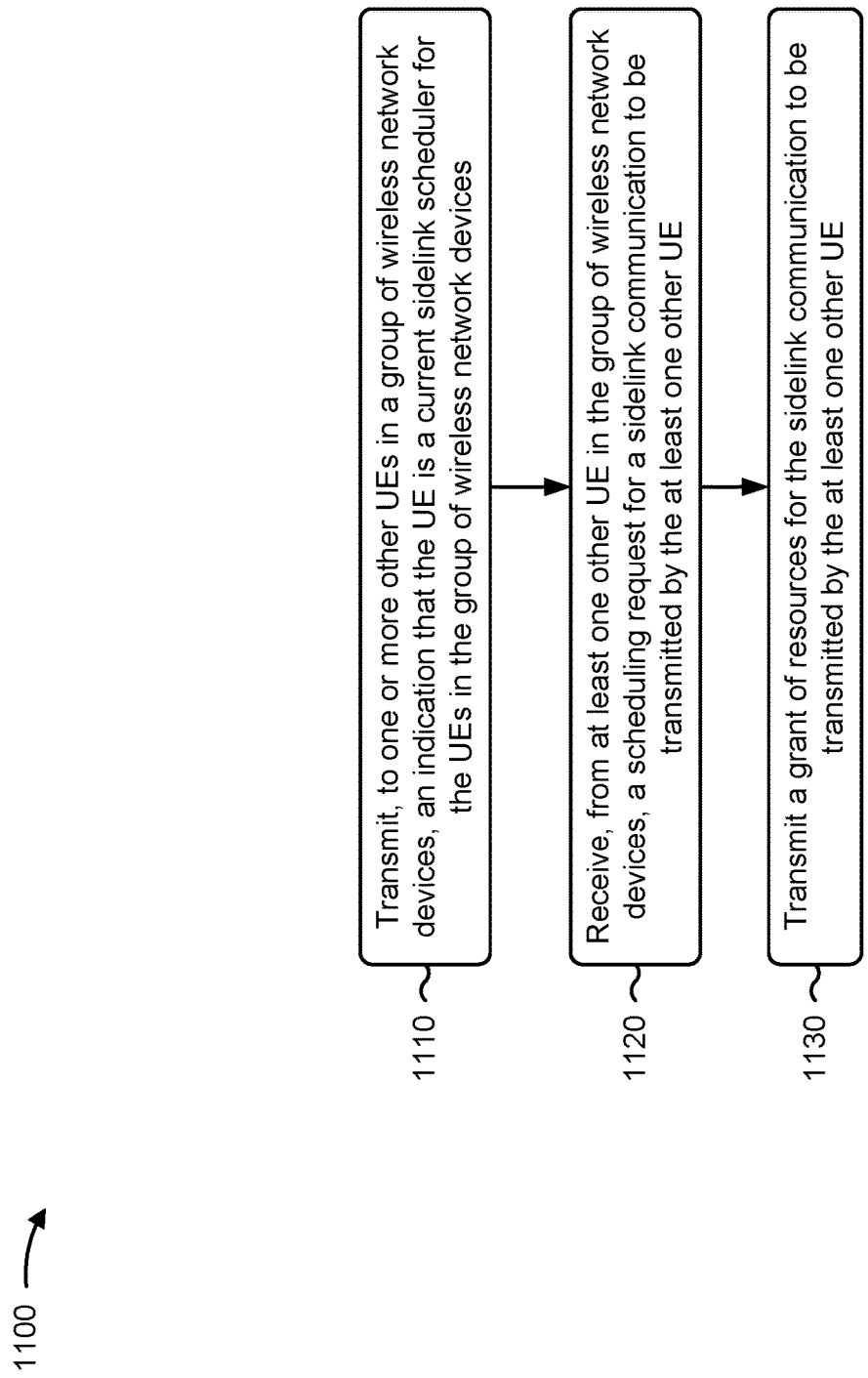
FIGS. 11-12 are diagrams illustrating example processes associated with a rotating sidelink scheduler, in accordance with the present disclosure.

FIG. 11 is a diagram illustrating an example process 1100 performed, for example, by a UE, in accordance with the present disclosure. Example process 1100 is an example where the UE (e.g., UE 120) performs operations associated with a rotating sidelink scheduler.

As shown in FIG. 11, in some aspects, process 1100 may include transmitting, to one or more other UEs in a group of wireless network devices that includes the UE and the one or more other UEs, an indication that the UE is a current sidelink scheduler for the UEs in the group of wireless network devices (block 1110). For example, the UE (e.g., using transmission component 1304, depicted in FIG. 13) may transmit, to one or more other UEs in a group of wireless network devices that includes the first UE and the one or more other UEs, an indication that the UE is a current sidelink scheduler for the UEs in the group of wireless network devices, as described above.

As further shown in FIG. 11, in some aspects, process 1100 may include receiving, from at least one other UE in the group of wireless network devices, a scheduling request for a sidelink communication to be transmitted by the at least one other UE (block 1120). For example, the UE (e.g., using reception component 1302, depicted in FIG. 13) may receive, from at least one other UE in the group of wireless network devices, a scheduling request for a sidelink communication to be transmitted by the at least one other UE, as described above.

As further shown in FIG. 11, in some aspects, process 1100 may include transmitting, to the at least one other UE, a grant of resources for the sidelink communication to be transmitted by the at least one other UE (block 1130). For example, the UE (e.g., using transmission component 1304, depicted in FIG. 13) may transmit, to the at least one other UE, a grant of resources for the sidelink communication to be transmitted by the at least one other UE, as described above.

Process 1100 may include additional aspects, such as any single aspect or any combination of aspects described below and/or in connection with one or more other processes described elsewhere herein.

In a first aspect, process 1100 includes transmitting, to another wireless network device in the group of wireless network devices, an indication that the other wireless network device is a next sidelink scheduler for the UEs in the group of wireless network devices.

In a second aspect, alone or in combination with the first aspect, transmitting the indication that the other wireless network device is the next sidelink scheduler is based at least in part on a time duration associated with the UE being the current sidelink scheduler for the UEs in the group of wireless network devices.

In a third aspect, alone or in combination with one or more of the first and second aspects, transmitting the indication that the other wireless network device is the next sidelink scheduler is based at least in part on a change in at least one of network topology or channel conditions for sidelink communications between the UEs in the group of wireless network devices.

In a fourth aspect, alone or in combination with one or more of the first through third aspects, the other wireless network device is one of the other UEs in the group of wireless network devices.

In a fifth aspect, alone or in combination with one or more of the first through fourth aspects, the group of wireless network devices includes at least one of a base station or a roadside unit, and the other wireless network device is the base station or the roadside unit.

In a sixth aspect, alone or in combination with one or more of the first through fifth aspects, process 1100 includes allocating the resources for the sidelink communication to be transmitted by the at least one other UE from a set of resources, granted by a base station, for scheduling sidelink communications by the UEs in the group of wireless network devices.

In a seventh aspect, alone or in combination with one or more of the first through sixth aspects, process 1100 includes transmitting, to the base station, at least one of a request for the set of resources for scheduling the sidelink communications by the UEs in the group of wireless network devices or a request to modify a previously granted set of resources for scheduling the sidelink communications by the UEs in the group of wireless network devices, and receiving, from the base station, a grant indicating the set of resources for scheduling the sidelink communications by the UEs in the group of wireless network devices.

In an eighth aspect, alone or in combination with one or more of the first through fifth aspects, process 1100 includes allocating the resources for the sidelink communication to be transmitted by the at least one other UE from a set of available resources determined based at least in part on channel sensing performed by the UE or another UE in the group of wireless network devices.

In a ninth aspect, alone or in combination with one or more of the first through eighth aspects, process 1100 includes selecting, from a first resource set granted by a base station and a second resource set determined based at least in part on channel sensing performed by the UE or another UE in the group of wireless network devices, a resource set for scheduling the sidelink communication to be transmitted by the at least one other UE, and allocating the resources for the sidelink communication to be transmitted by the at least one other UE from the resource set selected for scheduling the sidelink communication to be transmitted by the at least one other UE.

In a tenth aspect, alone or in combination with one or more of the first through ninth aspects, selecting the resource set for scheduling the sidelink communication to be transmitted by the at least one other UE comprises selecting one of the first resource set or the second resource set based at least in part on a priority associated with the sidelink communication to be transmitted by the at least one other UE.

In an eleventh aspect, alone or in combination with one or more of the first through tenth aspects, the UE is a first current sidelink scheduler that manages a first resource set, and another wireless network device, in the group of wireless network devices, is a second current sidelink scheduler that manages a second resource set, and process 1100 includes transmitting, to the second current sidelink scheduler, a request for resources in the second resource set for scheduling the sidelink communication to be transmitted by the at least one other UE, receiving, from the second current sidelink scheduler, an indication of available resources in the second resource set, and allocating the resources for the sidelink communication to be transmitted by the at least one other UE from the available resources in the second resource set.

In a twelfth aspect, alone or in combination with one or more of the first through eleventh aspects, the first resource set is determined based at least in part on channel sensing performed by the UE or another UE in the group of wireless network devices, the second resource set is granted by a base station, and the UE is outside of a coverage area associated with the base station, and allocating the resources for the sidelink communication to be transmitted by the at least one other UE comprises performing a reduced channel sensing procedure based at least in part on a determination that the available resources in the second resource set are sufficient for the UEs in the group of wireless network devices, and allocating the resources for the sidelink communication to be transmitted by the at least one other UE from the available resources in the second resource set based at least in part on performing the reduced channel sensing procedure.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
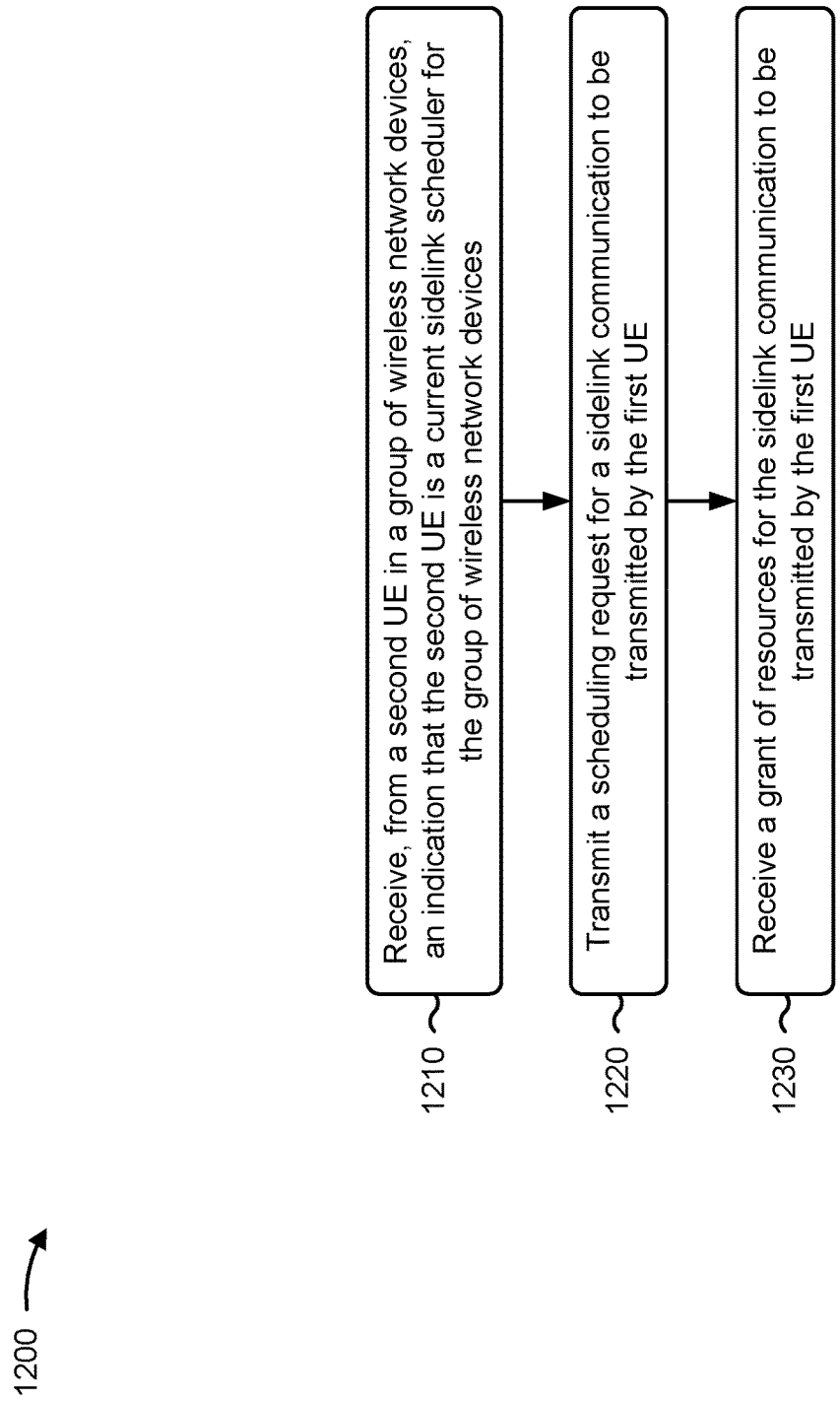

FIG. 12 is a diagram illustrating an example process 1200 performed, for example, by a first UE, in accordance with the present disclosure. Example process 1200 is an example where the UE (e.g., UE 120) performs operations associated with a rotating sidelink scheduler.

As shown in FIG. 12, in some aspects, process 1200 may include receiving, from a second UE in a group of wireless network devices that includes the first UE and the second UE, an indication that the second UE is a current sidelink scheduler for the group of wireless network devices (block 1210). For example, the UE (e.g., using reception component 1302, depicted in FIG. 13) may receive, from a second UE in a group of wireless network devices that includes the first UE and the second UE, an indication that the second UE is a current sidelink scheduler for the group of wireless network devices, as described above.

As further shown in FIG. 12, in some aspects, process 1200 may include transmitting, to the second UE, a scheduling request for a sidelink communication to be transmitted by the first UE (block 1220). For example, the UE (e.g., using transmission component 1304, depicted in FIG. 13) may transmit, to the second UE, a scheduling request for a sidelink communication to be transmitted by the first UE, as described above.

As further shown in FIG. 12, in some aspects, process 1200 may include receiving, from the second UE, a grant of resources for the sidelink communication to be transmitted by the first UE (block 1230). For example, the UE (e.g., using reception component 1302, depicted in FIG. 13) may receive, from the second UE, a grant of resources for the sidelink communication to be transmitted by the first UE, as described above.

Process 1200 may include additional aspects, such as any single aspect or any combination of aspects described below and/or in connection with one or more other processes described elsewhere herein.

In a first aspect, process 1200 includes transmitting the sidelink communication using the resources indicated in the grant received from the second UE.

In a second aspect, alone or in combination with the first aspect, the resources for the sidelink communication to be transmitted by the first UE are allocated by the second UE from a set of available resources determined based at least in part on channel sensing performed by the second UE, and transmitting the sidelink communication comprises transmitting the sidelink communication using the resources indicated in the grant received from the second UE, without performing channel sensing.

In a third aspect, alone or in combination with one or more of the first and second aspects, the second UE is one of multiple current sidelink schedulers for the group of wireless network devices, and process 1200 includes selecting, from the multiple current sidelink schedulers, to transmit the scheduling request to the second UE based at least in part on at least one of a distance between the first UE and the second UE, a path loss between the first UE and the second UE, or a priority associated with the sidelink communication to be transmitted by the first UE.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
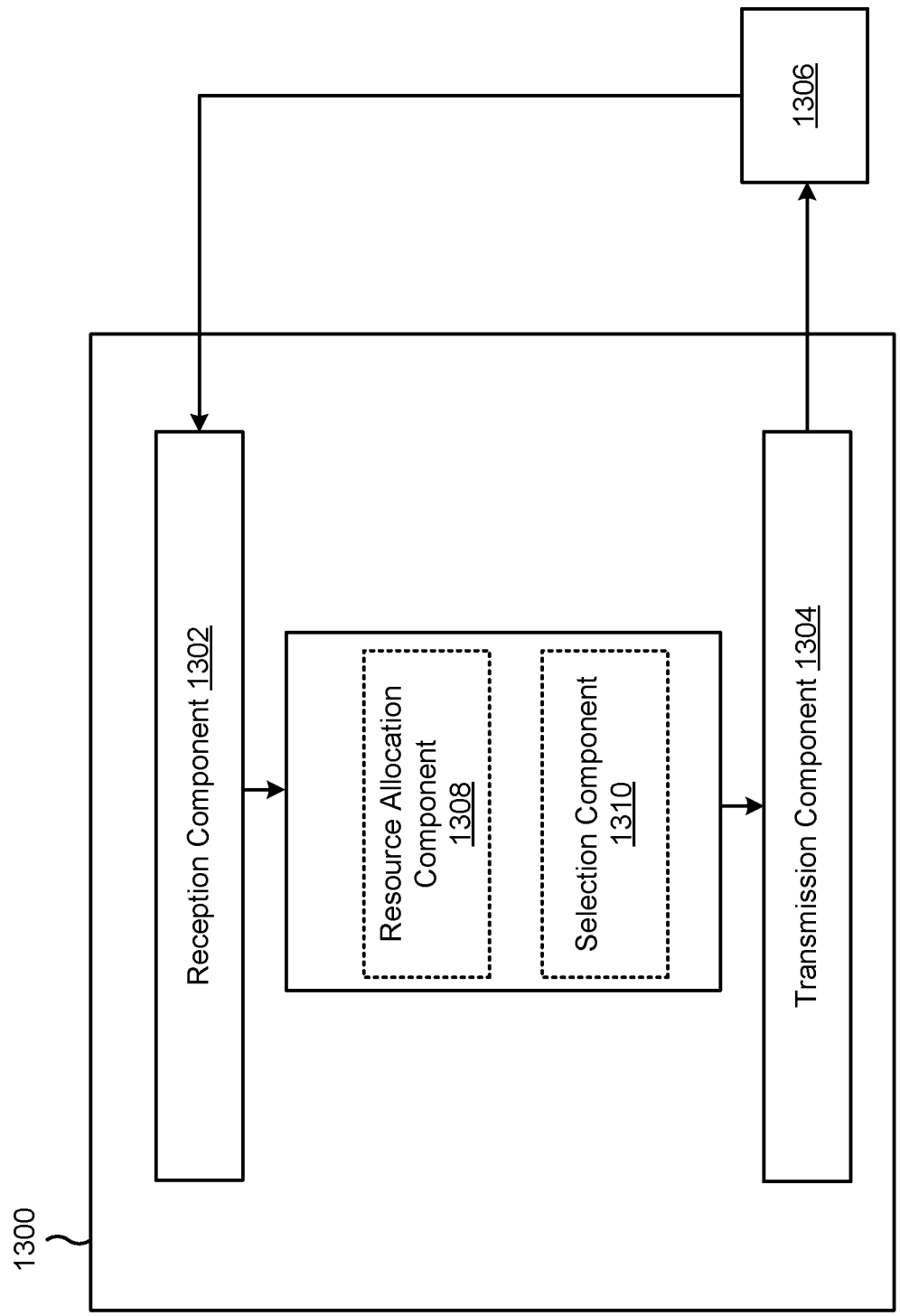
FIG. 13 is a block diagram of an example apparatus for wireless communication, in accordance with the present disclosure.

FIG. 13 is a block diagram of an example apparatus 1300 for wireless communication. The apparatus 1300 may be a UE, or a UE may include the apparatus 1300. In some aspects, the apparatus 1300 includes a reception component 1302 and a transmission component 1304, which may be in communication with one another (for example, via one or more buses and/or one or more other components). As shown, the apparatus 1300 may communicate with another apparatus 1306 (such as a UE, a base station, or another wireless communication device) using the reception component 1302 and the transmission component 1304. As further shown, the apparatus 1300 may include one or more of a resource allocation component 1308 or a selection component 1310, among other examples.

In some aspects, the apparatus 1300 may be configured to perform one or more operations described herein in connection with FIGS. 6-10. Additionally, or alternatively, the apparatus 1300 may be configured to perform one or more processes described herein, such as process 1100 of FIG. 11, process 1200 of FIG. 12, or a combination thereof. In some aspects, the apparatus 1300 and/or one or more components shown in FIG. 13 may include one or more components of the UE described above in connection with FIG. 2. Additionally, or alternatively, one or more components shown in FIG. 13 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1302 may receive communications, such as reference signals, control information, data communications, or a combination thereof, from the apparatus 1306. The reception component 1302 may provide received communications to one or more other components of the apparatus 1300. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1306. In some aspects, the reception component 1302 may include one or more antennas, a demodulator, a MIMO detector, a receive processor, a controller/processor, a memory, or a combination thereof, of the UE described above in connection with FIG. 2.

The transmission component 1304 may transmit communications, such as reference signals, control information, data communications, or a combination thereof, to the apparatus 1306. In some aspects, one or more other components of the apparatus 1306 may generate communications and may provide the generated communications to the transmission component 1304 for transmission to the apparatus 1306. In some aspects, the transmission component 1304 may perform signal processing on the generated communications (such as filtering, amplification, modulation, digital-to-analog conversion, multiplexing, interleaving, mapping, or encoding, among other examples), and may transmit the processed signals to the apparatus 1306. In some aspects, the transmission component 1304 may include one or more antennas, a modulator, a transmit MIMO processor, a transmit processor, a controller/processor, a memory, or a combination thereof, of the UE described above in connection with FIG. 2. In some aspects, the transmission component 1304 may be co-located with the reception component 1302 in a transceiver.

The transmission component 1304 may transmit, to one or more other UEs in a group of wireless network devices that includes the first UE and the one or more other UEs, an indication that the UE is a current sidelink scheduler for the UEs in the group of wireless network devices. The reception component 1302 may receive, from at least one other UE in the group of wireless network devices, a scheduling request for a sidelink communication to be transmitted by the at least one other UE. The transmission component 1304 may transmit, to the at least one other UE, a grant of resources for the sidelink communication to be transmitted by the at least one other UE.

The transmission component 1304 may transmit, to another wireless network device in the group of wireless network devices, an indication that the other wireless network device is a next sidelink scheduler for the UEs in the group of wireless network devices.

The resource allocation component 1308 may allocate the resources for the sidelink communication to be transmitted by the at least one other UE from a set of resources, granted by a base station, for scheduling sidelink communications by the UEs in the group of wireless network devices.

The transmission component 1304 may transmit, to the base station, at least one of a request for the set of resources for scheduling the sidelink communications by the UEs in the group of wireless network devices or a request to modify a previously granted set of resources for scheduling the sidelink communications by the UEs in the group of wireless network devices.

The reception component 1302 may receive, from the base station, a grant indicating the set of resources for scheduling the sidelink communications by the UEs in the group of wireless network devices.

The resource allocation component 1308 may allocate the resources for the sidelink communication to be transmitted by the at least one other UE from a set of available resources determined based at least in part on channel sensing performed by the UE or another UE in the group of wireless network devices.

The selection component 1310 may select, from a first resource set granted by a base station and a second resource set determined based at least in part on channel sensing performed by the UE or another UE in the group of wireless network devices, a resource set for scheduling the sidelink communication to be transmitted by the at least one other UE.

The resource allocation component 1308 may allocate the resources for the sidelink communication to be transmitted by the at least one other UE from the resource set selected for scheduling the sidelink communication to be transmitted by the at least one other UE.

The transmission component 1304 may transmit, to the second current sidelink scheduler, a request for resources in the second resource set for scheduling the sidelink communication to be transmitted by the at least one other UE.

The reception component 1302 may receive, from the second current sidelink scheduler, an indication of available resources in the second resource set.

The resource allocation component 1308 may allocate the resources for the sidelink communication to be transmitted by the at least one other UE from the available resources in the second resource set.

The reception component 1302 may receive, from a second UE in a group of wireless network devices that includes the UE and the second UE, an indication that the second UE is a current sidelink scheduler for the group of wireless network devices. The transmission component 1304 may transmit, to the second UE, a scheduling request for a sidelink communication to be transmitted by the UE. The reception component 1302 may receive, from the second UE, a grant of resources for the sidelink communication to be transmitted by the UE.

The transmission component 1304 may transmit the sidelink communication using the resources indicated in the grant received from the second UE.

The selection component 1310 may select, from multiple current sidelink schedulers, to transmit the scheduling request to the second UE based at least in part on at least one of a distance between the first UE and the second UE, a path loss between the first UE and the second UE, or a priority associated with the sidelink communication to be transmitted by the first UE.

The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally, or alternatively, a set of (one or more) components shown in FIG. 13 may perform one or more functions described as being performed by another set of components shown in FIG. 13.

The following provides an overview of some Aspects of the present disclosure:

Aspect 1: A method of wireless communication performed by a user equipment (UE), comprising: transmitting, to one or more other UEs in a group of wireless network devices that includes the UE and the one or more other UEs, an indication that the UE is a current sidelink scheduler for the UEs in the group of wireless network devices; receiving, from at least one other UE in the group of wireless network devices, a scheduling request for a sidelink communication to be transmitted by the at least one other UE; and transmitting, to the at least one other UE, a grant of resources for the sidelink communication to be transmitted by the at least one other UE.

Aspect 2: The method of Aspect 1, further comprising: transmitting, to another wireless network device in the group of wireless network devices, an indication that the other wireless network device is a next sidelink scheduler for the UEs in the group of wireless network devices.

Aspect 3: The method of Aspect 2, wherein transmitting the indication that the other wireless network device is the next sidelink scheduler is based at least in part on a time duration associated with the UE being the current sidelink scheduler for the UEs in the group of wireless network devices.

Aspect 4: The method of any of Aspects 2-3, wherein transmitting the indication that the other wireless network device is the next sidelink scheduler is based at least in part on a change in at least one of network topology or channel conditions for sidelink communications between the UEs in the group of wireless network devices.

Aspect 5: The method of any of Aspects 2-4, wherein the other wireless network device is one of the other UEs in the group of wireless network devices.

Aspect 6: The method of any of Aspects 2-4, wherein the group of wireless network devices includes at least one of a base station or a roadside unit, and the other wireless network device is the base station or the roadside unit.

Aspect 7: The method of any of Aspects 1-6, further comprising: allocating the resources for the sidelink communication to be transmitted by the at least one other UE from a set of resources, granted by a base station, for scheduling sidelink communications by the UEs in the group of wireless network devices.

Aspect 8: The method of Aspect 7, further comprising: transmitting, to the base station, at least one of a request for the set of resources for scheduling the sidelink communications by the UEs in the group of wireless network devices or a request to modify a previously granted set of resources for scheduling the sidelink communications by the UEs in the group of wireless network devices; and receiving, from the base station, a grant indicating the set of resources for scheduling the sidelink communications by the UEs in the group of wireless network devices.

Aspect 9: The method of any of Aspects 1-6, further comprising: allocating the resources for the sidelink communication to be transmitted by the at least one other UE from a set of available resources determined based at least in part on channel sensing performed by the UE or another UE in the group of wireless network devices.

Aspect 10: The method of any of Aspects 1-9, further comprising: selecting, from a first resource set granted by a base station and a second resource set determined based at least in part on channel sensing performed by the UE or another UE in the group of wireless network devices, a resource set for scheduling the sidelink communication to be transmitted by the at least one other UE; and allocating the resources for the sidelink communication to be transmitted by the at least one other UE from the resource set selected for scheduling the sidelink communication to be transmitted by the at least one other UE.

Aspect 11: The method of Aspect 10, wherein selecting the resource set for scheduling the sidelink communication to be transmitted by the at least one other UE comprises: selecting one of the first resource set or the second resource set based at least in part on a priority associated with the sidelink communication to be transmitted by the at least one other UE.

Aspect 12: The method of any of Aspects 1-9, wherein the UE is a first current sidelink scheduler that manages a first resource set, and another wireless network device, in the group of wireless network devices, is a second current sidelink scheduler that manages a second resource set, and the method further comprises: transmitting, to the second current sidelink scheduler, a request for resources in the second resource set for scheduling the sidelink communication to be transmitted by the at least one other UE; receiving, from the second current sidelink scheduler, an indication of available resources in the second resource set; and allocating the resources for the sidelink communication to be transmitted by the at least one other UE from the available resources in the second resource set.

Aspect 13: The method of Aspect 12, wherein the first resource set is determined based at least in part on channel sensing performed by the UE or another UE in the group of wireless network devices, the second resource set is granted by a base station, and the UE is outside of a coverage area associated with the base station, and wherein allocating the resources for the sidelink communication to be transmitted by the at least one other UE comprises: performing a reduced channel sensing procedure based at least in part on a determination that the available resources in the second resource set are sufficient for the UEs in the group of wireless network devices; and allocating the resources for the sidelink communication to be transmitted by the at least one other UE from the available resources in the second resource set based at least in part on performing the reduced channel sensing procedure.

Aspect 14: A method of wireless communication performed by a first user equipment (UE), comprising: receiving, from a second UE in a group of wireless network devices that includes the first UE and the second UE, an indication that the second UE is a current sidelink scheduler for the group of wireless network devices; transmitting, to the second UE, a scheduling request for a sidelink communication to be transmitted by the first UE; and receiving, from the second UE, a grant of resources for the sidelink communication to be transmitted by the first UE.

Aspect 15: The method of Aspect 14, further comprising: transmitting the sidelink communication using the resources indicated in the grant received from the second UE.

Aspect 16: The method of Aspect 15, wherein the resources for the sidelink communication to be transmitted by the first UE are allocated by the second UE from a set of available resources determined based at least in part on channel sensing performed by the second UE, and transmitting the sidelink communication comprises: transmitting the sidelink communication using the resources indicated in the grant received from the second UE, without performing channel sensing.

Aspect 17: The method of any of Aspects 14-16, wherein the second UE is one of multiple current sidelink schedulers for the group of wireless network devices, and the method further comprises: selecting, from the multiple current sidelink schedulers, to transmit the scheduling request to the second UE based at least in part on at least one of a distance between the first UE and the second UE, a path loss between the first UE and the second UE, or a priority associated with the sidelink communication to be transmitted by the first UE.

Aspect 18: An apparatus for wireless communication at a device, comprising a processor; memory coupled with the processor; and instructions stored in the memory and executable by the processor to cause the apparatus to perform the method of one or more Aspects of Aspects 1-13.

Aspect 19: An apparatus for wireless communication at a device, comprising a processor; memory coupled with the processor; and instructions stored in the memory and executable by the processor to cause the apparatus to perform the method of one or more Aspects of Aspects 14-17.

Aspect 20: A device for wireless communication, comprising a memory and one or more processors coupled to the memory, the memory and the one or more processors configured to perform the method of one or more Aspects of Aspects 1-13.

Aspect 21: A device for wireless communication, comprising a memory and one or more processors coupled to the memory, the memory and the one or more processors configured to perform the method of one or more Aspects of Aspects 14-17.

Aspect 22: An apparatus for wireless communication, comprising at least one means for performing the method of one or more Aspects of Aspects 1-13.

Aspect 23: An apparatus for wireless communication, comprising at least one means for performing the method of one or more Aspects of Aspects 14-17.

Aspect 24: A non-transitory computer-readable medium storing code for wireless communication, the code comprising instructions executable by a processor to perform the method of one or more Aspects of Aspects 1-13.

Aspect 25: A non-transitory computer-readable medium storing code for wireless communication, the code comprising instructions executable by a processor to perform the method of one or more Aspects of Aspects 14-17.

Aspect 26: A non-transitory computer-readable medium storing a set of instructions for wireless communication, the set of instructions comprising one or more instructions that, when executed by one or more processors of a device, cause the device to perform the method of one or more Aspects of Aspects 1-13.

Aspect 26: A non-transitory computer-readable medium storing a set of instructions for wireless communication, the set of instructions comprising one or more instructions that, when executed by one or more processors of a device, cause the device to perform the method of one or more Aspects of Aspects 14-17.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
   transmitting, to one or more other UEs in a group of wireless network devices that includes the UE and the one or more other UEs, an indication that the UE is a current sidelink scheduler for the UEs in the group of wireless network devices;
   receiving, from at least one other UE in the group of wireless network devices, a scheduling request for a sidelink communication to be transmitted by the at least one other UE; and
   transmitting, to the at least one other UE, a grant of resources for the sidelink communication to be transmitted by the at least one other UE.

2. The method of claim 1, further comprising:
   transmitting, to another wireless network device in the group of wireless network devices, an indication that the other wireless network device is a next sidelink scheduler for the UEs in the group of wireless network devices.

3. The method of claim 2, wherein transmitting the indication that the other wireless network device is the next sidelink scheduler is based at least in part on a time duration associated with the UE being the current sidelink scheduler for the UEs in the group of wireless network devices.

4. The method of claim 2, wherein transmitting the indication that the other wireless network device is the next sidelink scheduler is based at least in part on a change in at least one of network topology or channel conditions for sidelink communications between the UEs in the group of wireless network devices.

5. The method of claim 2, wherein the other wireless network device is one of the other UEs in the group of wireless network devices.

6. The method of claim 2, wherein the group of wireless network devices includes at least one of a base station or a roadside unit, and the other wireless network device is the base station or the roadside unit.

7. The method of claim 1, further comprising:
   allocating the resources for the sidelink communication to be transmitted by the at least one other UE from a set of resources, granted by a base station, for scheduling sidelink communications by the UEs in the group of wireless network devices.

8. The method of claim 7, further comprising:
   transmitting, to the base station, at least one of a request for the set of resources for scheduling the sidelink communications by the UEs in the group of wireless network devices or a request to modify a previously granted set of resources for scheduling the sidelink communications by the UEs in the group of wireless network devices; and
   receiving, from the base station, a grant indicating the set of resources for scheduling the sidelink communications by the UEs in the group of wireless network devices.

9. The method of claim 1, further comprising:
   allocating the resources for the sidelink communication to be transmitted by the at least one other UE from a set of available resources determined based at least in part on channel sensing performed by the UE or another UE in the group of wireless network devices.

10. The method of claim 1, further comprising:
    selecting, from a first resource set granted by a base station and a second resource set determined based at least in part on channel sensing performed by the UE or another UE in the group of wireless network devices, a resource set for scheduling the sidelink communication to be transmitted by the at least one other UE; and
    allocating the resources for the sidelink communication to be transmitted by the at least one other UE from the resource set selected for scheduling the sidelink communication to be transmitted by the at least one other UE.

11. The method of claim 10, wherein selecting the resource set for scheduling the sidelink communication to be transmitted by the at least one other UE comprises:
selecting one of the first resource set or the second resource set based at least in part on a priority associated with the sidelink communication to be transmitted by the at least one other UE.

12. The method of claim 1, wherein the UE is a first current sidelink scheduler that manages a first resource set, and another wireless network device, in the group of wireless network devices, is a second current sidelink scheduler that manages a second resource set, and the method further comprises:
transmitting, to the second current sidelink scheduler, a request for resources in the second resource set for scheduling the sidelink communication to be transmitted by the at least one other UE;
receiving, from the second current sidelink scheduler, an indication of available resources in the second resource set; and
allocating the resources for the sidelink communication to be transmitted by the at least one other UE from the available resources in the second resource set.

13. The method of claim 12, wherein the first resource set is determined based at least in part on channel sensing performed by the UE or another UE in the group of wireless network devices, the second resource set is granted by a base station, and the UE is outside of a coverage area associated with the base station, and wherein allocating the resources for the sidelink communication to be transmitted by the at least one other UE comprises:
performing a reduced channel sensing procedure based at least in part on a determination that the available resources in the second resource set are sufficient for the UEs in the group of wireless network devices; and
allocating the resources for the sidelink communication to be transmitted by the at least one other UE from the available resources in the second resource set based at least in part on performing the reduced channel sensing procedure.

14. A method of wireless communication performed by a first user equipment (UE), comprising:
receiving, from a second UE in a group of wireless network devices that includes the first UE and the second UE, an indication that the second UE is a current sidelink scheduler for the group of wireless network devices;
transmitting, to the second UE, a scheduling request for a sidelink communication to be transmitted by the first UE; and
receiving, from the second UE, a grant of resources for the sidelink communication to be transmitted by the first UE.

15. The method of claim 14, further comprising:
transmitting the sidelink communication using the resources indicated in the grant received from the second UE.

16. The method of claim 15, wherein the resources for the sidelink communication to be transmitted by the first UE are allocated by the second UE from a set of available resources determined based at least in part on channel sensing performed by the second UE, and transmitting the sidelink communication comprises:
transmitting the sidelink communication using the resources indicated in the grant received from the second UE, without performing channel sensing.

17. The method of claim 14, wherein the second UE is one of multiple current sidelink schedulers for the group of wireless network devices, and the method further comprises:
selecting, from the multiple current sidelink schedulers, to transmit the scheduling request to the second UE based at least in part on at least one of a distance between the first UE and the second UE, a path loss between the first UE and the second UE, or a priority associated with the sidelink communication to be transmitted by the first UE.

18. A user equipment (UE) for wireless communication, comprising:
a memory; and
one or more processors operatively coupled to the memory, the memory and the one or more processors configured to:
transmit, to one or more other UEs in a group of wireless network devices that includes the UE and the one or more other UEs, an indication that the UE is a current sidelink scheduler for the UEs in the group of wireless network devices;
receive, from at least one other UE in the group of wireless network devices, a scheduling request for a sidelink communication to be transmitted by the at least one other UE; and
transmit, to the at least one other UE, a grant of resources for the sidelink communication to be transmitted by the at least one other UE.

19. The UE of claim 18, wherein the one or more processors are further configured to:
transmit, to another wireless network device in the group of wireless network devices, an indication that the other wireless network device is a next sidelink scheduler for the UEs in the group of wireless network devices.

20. The UE of claim 19, wherein the one or more processors are configured to transmit the indication that the other wireless network device is the next sidelink scheduler is based at least in part on a time duration associated with the UE being the current sidelink scheduler for the UEs in the group of wireless network devices.

21. The UE of claim 19, wherein the one or more processors are configured to transmit the indication that the other wireless network device is the next sidelink scheduler is based at least in part on a change in at least one of network topology or channel conditions for sidelink communications between the UEs in the group of wireless network devices.

22. The UE of claim 18, wherein the one or more processors are further configured to:
allocate the resources for the sidelink communication to be transmitted by the at least one other UE from a set of resources, granted by a base station, for scheduling sidelink communications by the UEs in the group of wireless network devices.

23. The UE of claim 22, wherein the one or more processors are further configured to:
transmit, to the base station, at least one of a request for the set of resources for scheduling the sidelink communications by the UEs in the group of wireless network devices or a request to modify a previously granted set of resources for scheduling the sidelink communications by the UEs in the group of wireless network devices; and
receive, from the base station, a grant indicating the set of resources for scheduling the sidelink communications by the UEs in the group of wireless network devices.

24. The UE of claim 18, wherein the one or more processors are further configured to:

allocate the resources for the sidelink communication to be transmitted by the at least one other UE from a set of available resources determined based at least in part on channel sensing performed by the UE or another UE in the group of wireless network devices.

25. The UE of claim 18, wherein the one or more processors are further configured to:
select, from a first resource set granted by a base station and a second resource set determined based at least in part on channel sensing performed by the UE or another UE in the group of wireless network devices, a resource set for scheduling the sidelink communication to be transmitted by the at least one other UE; and
allocate the resources for the sidelink communication to be transmitted by the at least one other UE from the resource set selected for scheduling the sidelink communication to be transmitted by the at least one other UE.

26. The UE of claim 25, wherein the one or more processors, when selecting the resource set for scheduling the sidelink communication to be transmitted by the at least one other UE, are configured to:
select one of the first resource set or the second resource set based at least in part on a priority associated with the sidelink communication to be transmitted by the at least one other UE.

27. The UE of claim 18, wherein the UE is a first current sidelink scheduler that manages a first resource set, and another wireless network device, in the group of wireless network devices, is a second current sidelink scheduler that manages a second resource set, and the one or more processors are further configured to:
transmit, to the second current sidelink scheduler, a request for resources in the second resource set for scheduling the sidelink communication to be transmitted by the at least one other UE;
receive, from the second current sidelink scheduler, an indication of available resources in the second resource set; and
allocate the resources for the sidelink communication to be transmitted by the at least one other UE from the available resources in the second resource set.

28. The UE of claim 27, wherein the first resource set is determined based at least in part on channel sensing performed by the UE or another UE in the group of wireless network devices, the second resource set is granted by a base station, and the UE is outside of a coverage area associated with the base station, and wherein the one or more processors, when allocating the resources for the sidelink communication to be transmitted by the at least one other UE, are configured to:
perform a reduced channel sensing procedure based at least in part on a determination that the available resources in the second resource set are sufficient for the UEs in the group of wireless network devices; and
allocate the resources for the sidelink communication to be transmitted by the at least one other UE from the available resources in the second resource set based at least in part on performing the reduced channel sensing procedure.

29. A first user equipment (UE) for wireless communication, comprising:
a memory; and
one or more processors operatively coupled to the memory, the memory and the one or more processors configured to:
receive, from a second UE in a group of wireless network devices that includes the first UE and the second UE, an indication that the second UE is a current sidelink scheduler for the group of wireless network devices;
transmit, to the second UE, a scheduling request for a sidelink communication to be transmitted by the first UE; and
receive, from the second UE, a grant of resources for the sidelink communication to be transmitted by the first UE.

30. The first UE of claim 29, wherein the one or more processors are further configured to:
transmit the sidelink communication using the resources indicated in the grant received from the second UE.

* * * * *